United States Patent
Takagi

(10) Patent No.: US 10,843,711 B2
(45) Date of Patent: Nov. 24, 2020

(54) METHOD AND DEVICE FOR GENERATING TARGET PATH FOR AUTONOMOUS VEHICLE

(71) Applicant: Nissan Motor Co., Ltd., Yokohama (JP)

(72) Inventor: Yoshitaka Takagi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/631,469

(22) PCT Filed: Aug. 22, 2017

(86) PCT No.: PCT/JP2017/029886
§ 371 (c)(1),
(2) Date: Jan. 16, 2020

(87) PCT Pub. No.: WO2019/038822
PCT Pub. Date: Feb. 28, 2019

(65) Prior Publication Data
US 2020/0207368 A1    Jul. 2, 2020

(51) Int. Cl.
*B60W 60/00* (2020.01)
*B60K 28/02* (2006.01)
*G05D 1/00* (2006.01)
*G05D 1/02* (2020.01)

(52) U.S. Cl.
CPC ......... *B60W 60/0011* (2020.02); *B60K 28/02* (2013.01); *G05D 1/0088* (2013.01); *G05D 1/0223* (2013.01); *B60W 2520/10* (2013.01); *B60W 2520/125* (2013.01);
(Continued)

(58) Field of Classification Search
CPC ....... B60W 60/0011; B60W 2540/229; B60W 2552/30; B60W 2520/10; B60W 2520/125; B60W 2520/14; B60W 30/095; B60W 30/10; B60K 28/02; G05D 1/0088;
(Continued)

(56) References Cited

U.S. PATENT DOCUMENTS

| 8,874,301 B1 | 10/2014 | Rao et al. |
| 9,950,708 B1 * | 4/2018 | Cullinane ............. B60W 30/09 |
| 2006/0267781 A1 | 11/2006 | Coulter |

(Continued)

FOREIGN PATENT DOCUMENTS

| CN | 105936276 A | 9/2016 |
| JP | 2001-1787 A | 1/2001 |

(Continued)

*Primary Examiner* — Genna M Mott
(74) *Attorney, Agent, or Firm* — Global IP Counselors, LLP

(57) ABSTRACT

A target path generation device is provided with a controller for generating the target path for an autonomous vehicle. The controller performs a method that includes acquiring travel path boundaries of a road in a host vehicle surroundings; determining a presence or absence of an occupant; generating a first target path with regards to the travel path boundaries upon determining that the occupant is present; generating a second target path with regards to the travel path boundaries upon determining no occupant is present; and imparting a difference in the target path between the first target path and the second target path when traveling on a curved road.

8 Claims, 13 Drawing Sheets

(52) U.S. Cl.
CPC ... *B60W 2520/14* (2013.01); *B60W 2540/229* (2020.02); *B60W 2552/30* (2020.02); *G05D 2201/0213* (2013.01)

(58) Field of Classification Search
CPC ......... G05D 1/0223; G05D 2201/0213; G01C 21/26; G08G 1/16
See application file for complete search history.

(56) References Cited

U.S. PATENT DOCUMENTS

| | | | |
|---|---|---|---|
| 2017/0247040 A1* | 8/2017 | Miller | B60W 30/182 |
| 2018/0215392 A1* | 8/2018 | Kosaka | G05D 1/0276 |
| 2018/0356830 A1* | 12/2018 | Haghighat | B60W 10/04 |

FOREIGN PATENT DOCUMENTS

| | | |
|---|---|---|
| JP | 2008-30617 A | 2/2008 |
| JP | 2015-209132 A | 11/2015 |
| JP | 6179654 B1 | 8/2017 |
| JP | 2018-96404 A | 6/2018 |
| SE | 1451117 A1 | 3/2016 |
| WO | 2016/158236 A1 | 10/2016 |

\* cited by examiner

US 10,843,711 B2

METHOD AND DEVICE FOR GENERATING TARGET PATH FOR AUTONOMOUS VEHICLE

CROSS-REFERENCE TO RELATED APPLICATIONS

This application is a U.S. national stage application of International Application No. PCT/JP2017/029886, filed on Aug. 22, 2017.

BACKGROUND

Technical Field

The present disclosure relates to a method and a device for generating a target path for an autonomous vehicle.

Background Information

Conventional vehicle control devices that switch between manned driving and unmanned driving for the purpose of improving the fuel economy of primarily trailers traveling in a platoon format are known (for example, see Japanese Laid-Open Patent Application No. 2001-001787). With these conventional devices, when a trailing trailer is unmanned, vibration damping control and acceleration/deceleration control implemented to improve riding comfort and the sense of discomfort are stopped or suppressed by switching the various controls of the powertrain system, and the energy consumption amount in association therewith is gained.

SUMMARY

However, with prior-art devices, in platoon travel for example, the target path to be followed is determined on the basis of movement by a leading target vehicle, and thus the margin for target path adjustments is extremely small. Therefore, in the case of an autonomous driving system in which modes are present for unmanned driving and manned driving through independent travel as with an unmanned taxi, there is margin for adjusting the target path by manned and unmanned driving.

The problem described above was the subject of particular focus in the present disclosure, it being an object thereof to provide a method and a device for generating a target path for an autonomous vehicle, whereby an appropriate target path is generated according to the presence or absence of an occupant.

To achieve the object described above, the present disclosure comprises a controller for generating a target path that can be tracked by a host vehicle, that does not deviate from a road, and that involves no contact with an obstacle. In this method for generating a target path for an autonomous vehicle, determining a presence or absence of an occupant. Generating a first target path with regards to the travel path boundaries upon determining that the occupant is present. Generating a second target path with regards to the travel path boundaries upon determining no occupant is present. Imparting a difference in target path between the first target path and the second target path when traveling on a curved road.

In this manner, an appropriate target path can be generated in response to the presence or absence of an occupant by imparting a difference in the target path between the first target path and the second target path.

DETAILED DESCRIPTION OF THE EMBODIMENTS

Figure 1:
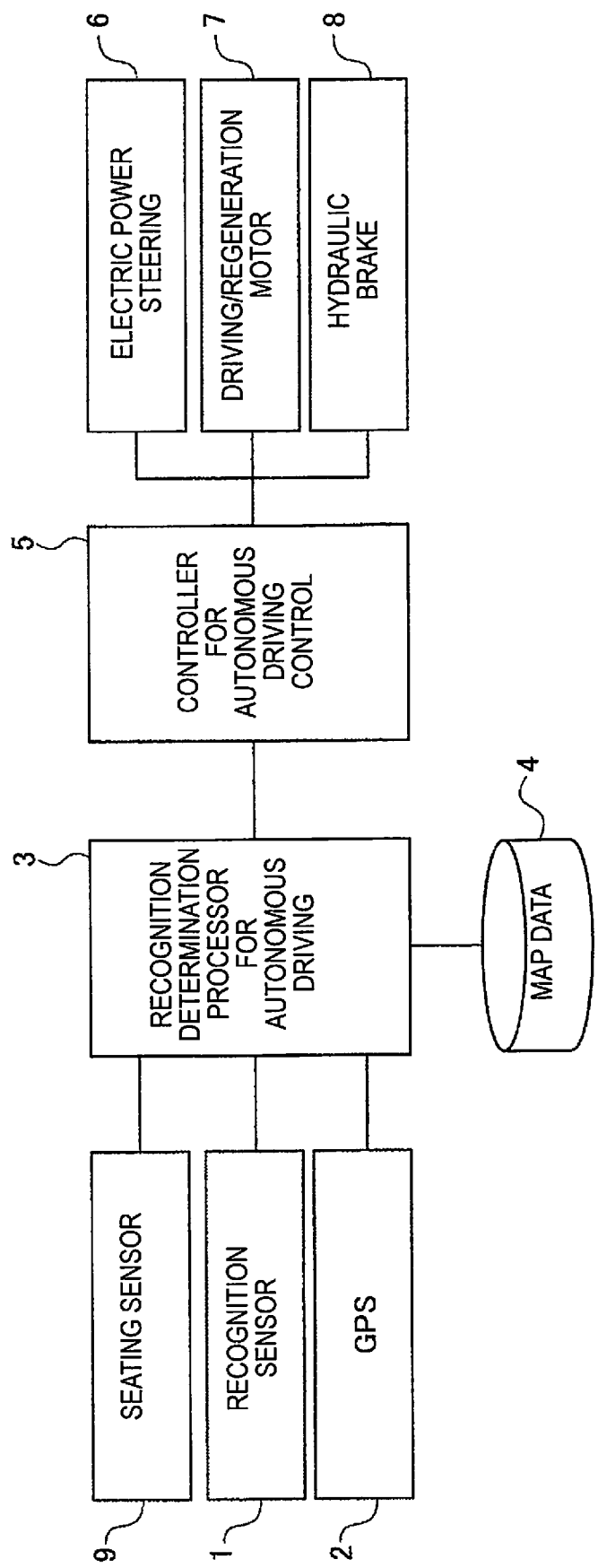
FIG. 1 is an overall configuration drawing illustrating an autonomous driving system configuration of an autonomous vehicle in which a method and a device are applied for generating a target path for an autonomous vehicle in accordance with a first embodiment.

Preferred embodiments for carrying out the method and device for generating a target path for an autonomous vehicle (host vehicle) according to the present disclosure are described below on the basis of first to fourth embodiments shown in the drawings.

First Embodiment

First, the configuration is described. A method and device for generating a target path for an autonomous vehicle in the first embodiment are applied to an autonomous vehicle for which steering, driving, and braking can be externally controlled, the autonomous vehicle being based on a motor-driven hybrid vehicle (one example of an electric-powered vehicle). The description of the configuration of the first embodiment below is divided into an "autonomous driving system configuration", a "detailed configuration of a recognition determination processor for autonomous driving" and a "processing configuration for generating a target path and setting a target speed value for an autonomous vehicle".

Autonomous Driving System Configuration

FIG. 1 shows an autonomous driving system configuration of an autonomous vehicle in which the method and device for generating a target path for an autonomous vehicle of the first embodiment are applied. The overall configuration of the autonomous driving system is described below on the basis of FIG. 1.

The autonomous driving system is provided with a recognition sensor 1, a GPS 2, a recognition determination processor 3 (controller) for autonomous driving, and map data 4. The autonomous driving system is also provided with a controller 5 (vehicle control means) for autonomous driving control electric power steering 6, a driving/regeneration motor 7, a hydraulic brake 8, and a seating sensor 9. In other words, the recognition determination processor 3 for autonomous driving and the controller 5 for autonomous driving control, which calculates each control command value and transmits each calculated value to respective actuator ECUs, are installed as an onboard processing system. A description of each actuator ECU is omitted.

The recognition sensor 1 is provided to recognize the external environment (travel path boundaries, etc.) surrounding the host vehicle such as in front of and behind the host vehicle. Representative examples of such a recognition sensor 1 include an onboard camera and laser radar mounted at each of a front part and a rear part of the host vehicle. The term "travel path boundary" used here is a boundary of a road width, a road shape, and a traffic lane, or such.

The GPS 2 is a position detection means that is installed in the host vehicle to detect a travel position (latitude and longitude) of the host vehicle during travel. "GPS" is an abbreviation for "global positioning system."

The recognition determination processor 3 for autonomous driving integrates and processes map data 4, information from the GPS 2, and information from the recognition sensor 1, and calculates various profiles such as a target speed profile (i.e., the target vehicle speed profile). In other words, the vehicle speed and basic route to a destination specified by an occupant, etc., are calculated on the basis of map data 4 stored in an onboard memory. In addition, the target path in the vicinity and the target vehicle speed are sequentially corrected as a profile on the basis of sensing results for the vehicle surroundings obtained by the onboard recognition sensor 1 while the basic route and vehicle speed are being followed on the basis of position information from the GPS 2.

The map data 4 is stored in the onboard memory, and includes road information such as the slope and speed limit, written therein. When the travel position of the host vehicle is detected by the GPS 2 during travel, map information of this map data 4, centered on the travel position of the host vehicle, is read out from the recognition determination processor 3 for autonomous driving.

The controller 5 for autonomous driving control decides various command values for the steering amount, driving amount, and braking amount on the basis of profile information (target path, target vehicle speed, etc.) from the recognition determination processor 3 for autonomous driving. Steering control is implemented by the electric power steering 6, which is a steering actuator. Driving control is implemented by the driving/regeneration motor 7, which is a drive source actuator, and braking control is implemented by distribution of a regeneration portion by the driving/regeneration motor 7 and a mechanical braking portion by the hydraulic brake 8. Steering control, driving control, and braking control are implemented by each ECU provided with each actuator.

The electric power steering 6 is a steering actuator that implements automatic steering in accordance with a control command value from the controller 5 for autonomous driving control.

The driving/regeneration motor 7 is a drive source actuator that implements constant speed travel and accelerating travel through driving, or decelerating travel through regeneration, in accordance with control command values from the controller 5 for autonomous driving control.

The hydraulic brake 8 is a brake actuator that actuates hydraulic braking in accordance with a control command value from the controller 5 for autonomous driving control.

The seating sensor 9 is attached to a seat in the vehicle, and detects pressure when an occupant is seated, and thereby determining a presence or absence of an occupant.

Figure 2:
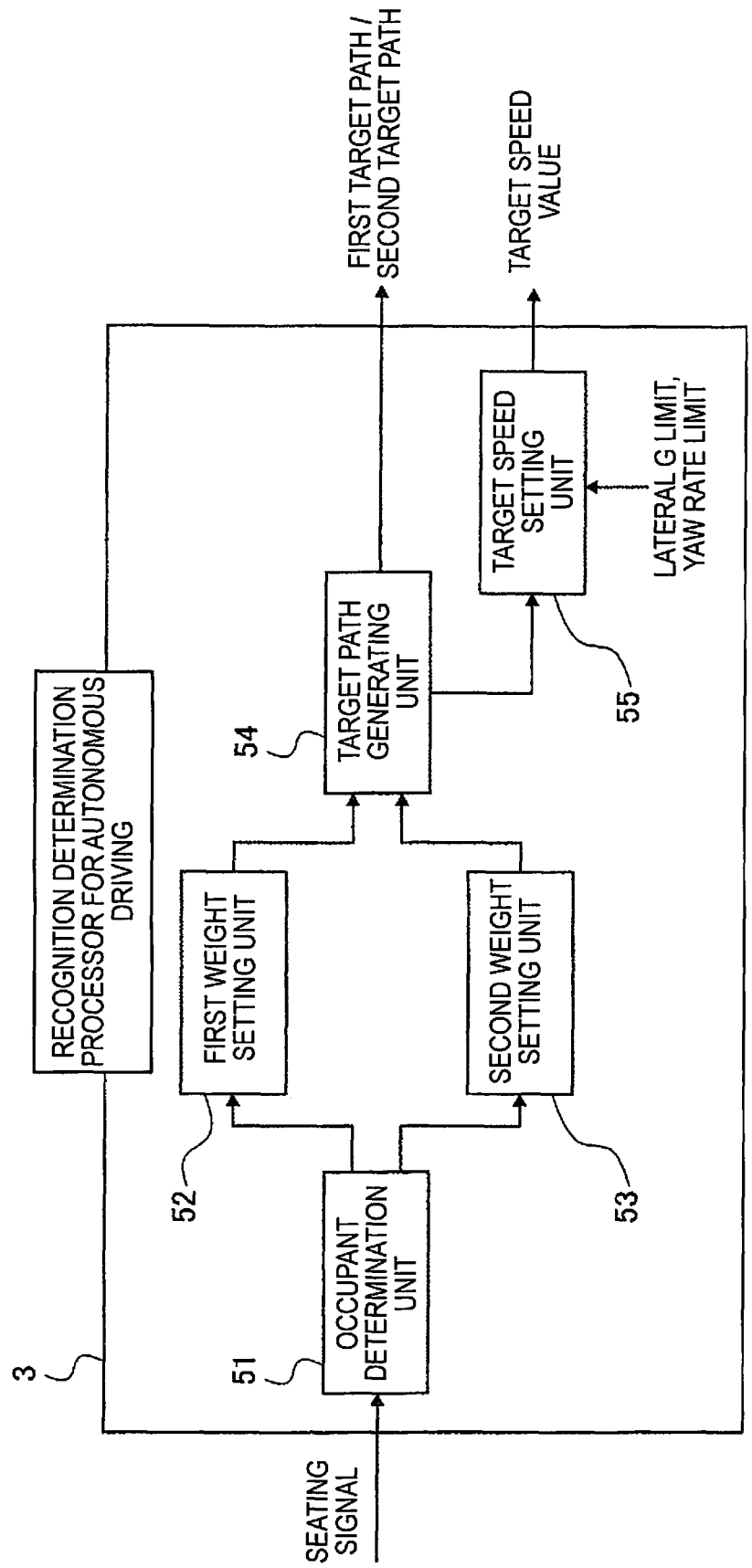
FIG. 2 is a block diagram illustrating a target path generation process and a target speed value setting process for an autonomous vehicle, executed by a recognition determination processor for autonomous driving of the first embodiment.

Detailed Configuration of Recognition Determination Processor for Autonomous Driving FIG. 2 shows a block diagram of target path generation process and target speed value setting process for an autonomous vehicle, executed by a recognition determination processor for autonomous driving of the first embodiment. A detailed configuration of a recognition determination processor for autonomous driving is described below on the basis of FIG. 2.

The recognition determination processor 3 for autonomous driving is provided with an occupant determination unit 51 (occupant determining means), a first weight setting unit 52 (first target path generating means), and a second weight setting unit 53 (second target path generating means). Moreover, the recognition determination processor 3 for autonomous driving is provided with a target path generating unit 54 (first target path generating means and second target path generating means), and a target speed setting unit 55 (target speed setting means).

The occupant determination unit 51 receives a seating signal from the seating sensor 9, and determines the presence or absence of an occupant on the basis of the seating signal. The occupant determination unit 51 outputs an OCCUPANT PRESENT signal to the first weight setting unit 52, and outputs an OCCUPANT ABSENT signal to the second weight setting unit 53.

The first weight setting unit 52 receives an OCCUPANT PRESENT signal of the occupant determination unit 51, and sets a first weight setting signal (weight setting signal during manned driving) on the basis of the OCCUPANT PRESENT signal. The first weight setting unit 52 outputs the first weight setting signal to the target path generating unit 54.

The second weight setting unit 53 receives an OCCUPANT ABSENT signal of the occupant determination unit 51, and sets a second weight setting signal (weight setting signal during unmanned driving) on the basis of the OCCUPANT ABSENT signal. The second weight setting unit 53 outputs the second weight setting signal to the target path generating unit 54.

The target path generating unit 54 receives the first weight setting signal of the first weight setting unit 52 or the second weight setting signal of the second weight setting unit 53, and generates, on the basis of the first weight setting signal or the second weight setting signal, a first target path or a second target path using a below-described evaluation function H. The target path generating unit 54 outputs the generated first target path or second target path to the target speed setting unit 55 and the controller 5 for autonomous driving control.

The target speed setting unit 55 receives the first target path or the second target path, and a preset lateral acceleration limit (lateral G limit) and a preset yaw rate limit of the host vehicle. This target speed setting unit 55 sets a value of a target speed when traveling along the first target path or the second target path, and the value of the target speed is set to a speed that does not exceed the limits of both the preset lateral acceleration limit and the preset yaw rate limit of the host vehicle. The target speed setting unit 55 outputs the set target speed value to the controller 5 for autonomous driving control.

Figure 3:
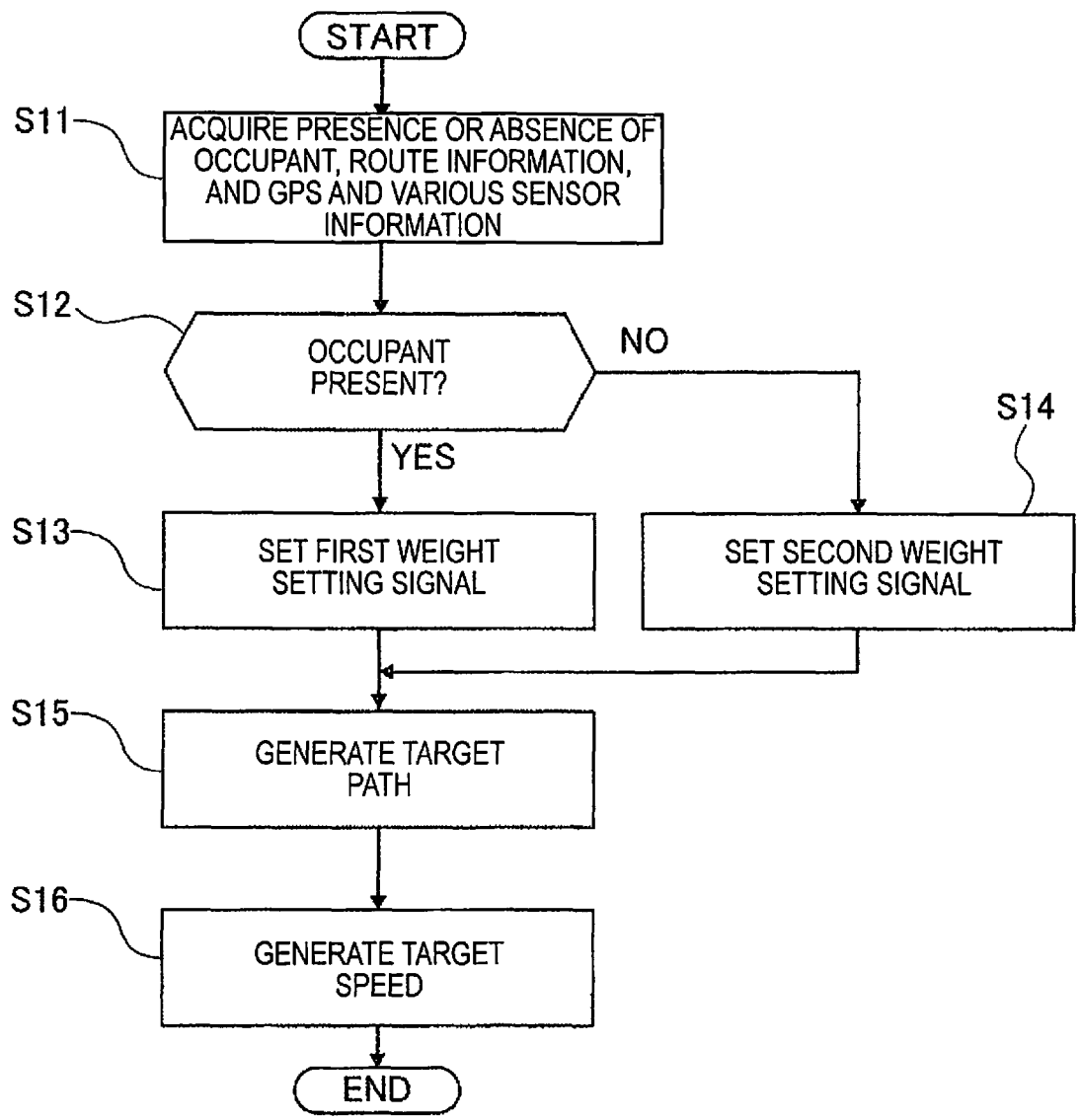
FIG. 3 is a flowchart illustrating the flow of the target path generation process and target speed value setting process for an autonomous vehicle, executed by the recognition determination processor for autonomous driving of the first embodiment.
Figure 4A:
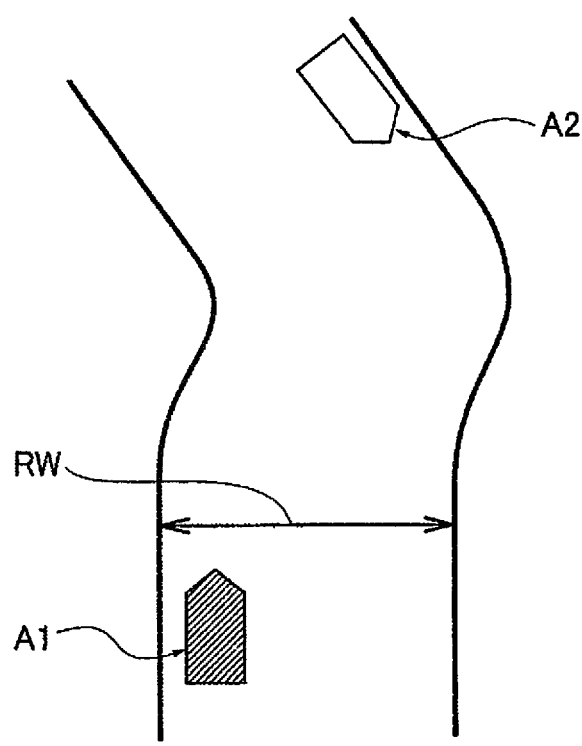
FIG. 4A illustrates an example of a road scene in which the road is not designed for one-way traffic and does not have a center line.
Figure 4B:
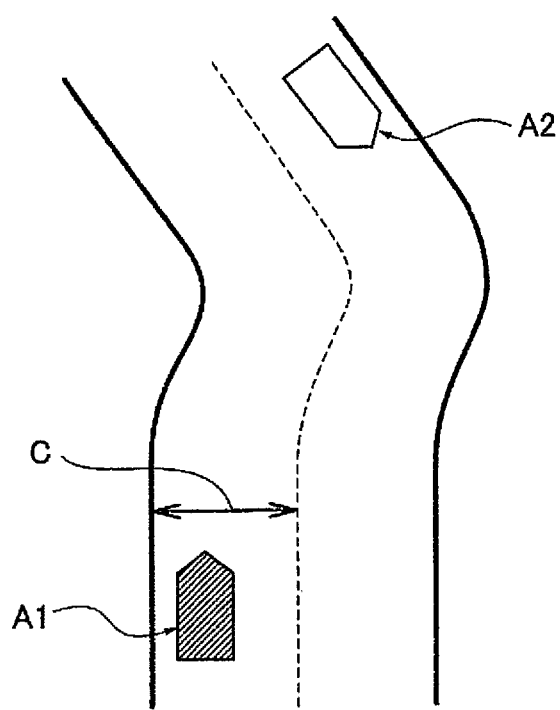
FIG. 4B is an explanatory diagram illustrating an example of interpolation of landmark information in FIG. 4A.
Figure 5A:
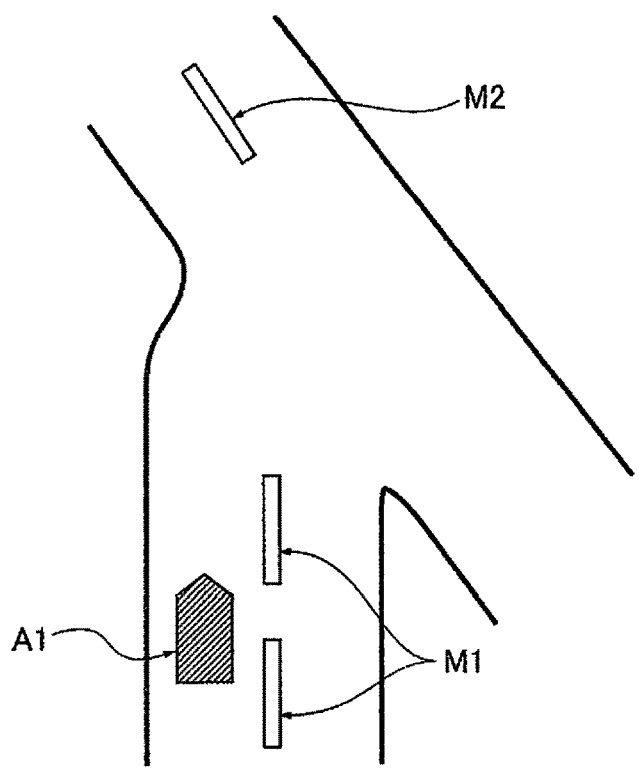
FIG. 5A is a diagram illustrating an example of a road scene in which landmark information disappears in the middle of an intersection or a T-shaped road junction.
Figure 5B:
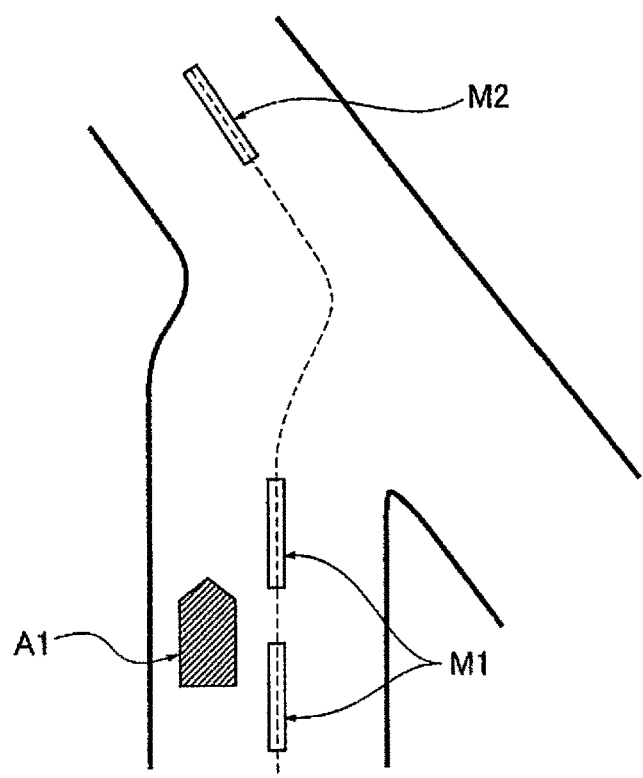
FIG. 5B is an explanatory diagram illustrating an example of interpolation of the landmark information in FIG. 5A.
Figure 6:
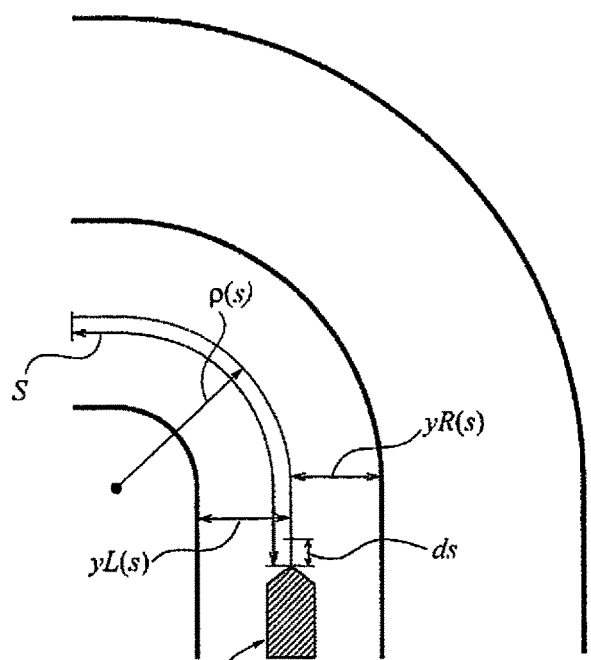
FIG. 6 is a diagram showing variables and functions for generating a first target path or a second target path in the first to fourth embodiments.
Figure 7:
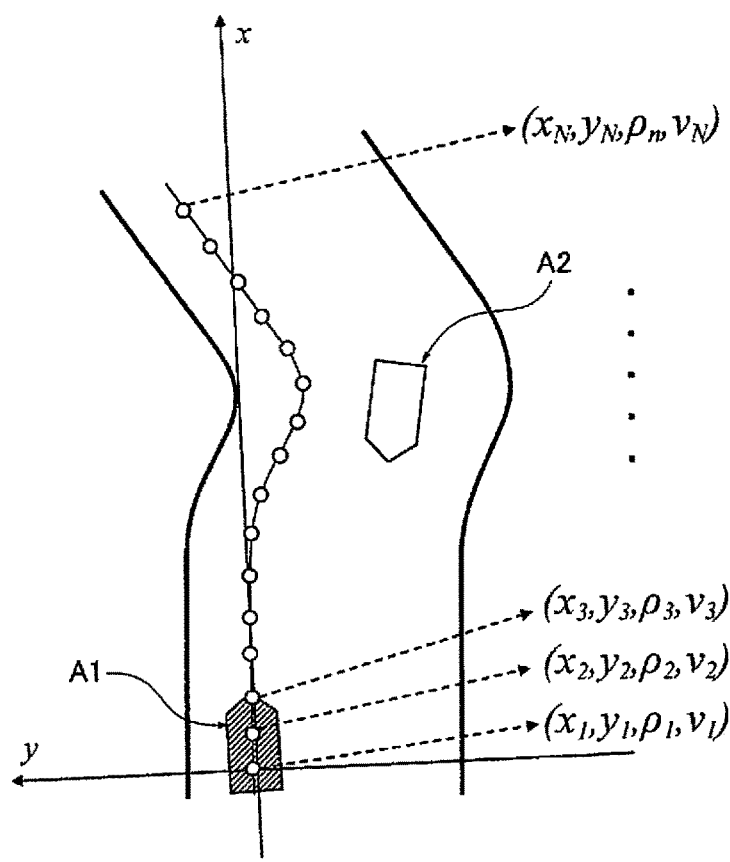
FIG. 7 is a diagram of an example of a method for storing the first target path or second target path and the target speed, generated in the first to fourth embodiments.

Processing Configuration for Generating a Target Path and Setting a Target Speed Value for an Autonomous Vehicle FIG. 3 shows the flow of the target path generation process and target speed value setting process for an autonomous vehicle, executed by the recognition determination processor for autonomous driving of the first embodiment. That is, FIG. 3 shows the flow of the target path generation process and target speed value setting process of FIG. 2 for an autonomous vehicle. FIG. 4A shows an example of a road scene in which the road is not designed for one-way traffic and does not have a center line, and FIG. 4B shows an example of interpolation of the landmark information in FIG. 4A. FIG. 5A shows an example of a road scene in which landmark information disappears in the middle of an intersection or a T-shaped road junction, and FIG. 5B shows an example of interpolation of the landmark information in FIG. 5A. FIG. 6 shows variables and functions for generating a first target path or a second target path, and FIG. 7 shows an example of a method for storing the first target path or second target path and target speed that were generated.

The flowchart of FIG. 3 is from a state in which route setting is completed, conditions necessary for autonomous driving are satisfied, and the vehicle is traveling in autonomous driving mode. Here, route setting shall be the matter of automatically calculating the route to a destination on the basis of destination information input manually by an occupant or an operator outside of the vehicle. A detailed description of the method for setting the route is omitted herein. To improve autonomous driving performance, a system that can acquire position information with high precision is used as the GPS 2, and digital data that correctly expresses the actual environment with high precision is used as the map data 4. Also, in FIG. 4 to FIG. 7, the host vehicle (autonomous vehicle) is indicated by "A1". Each step in the flowchart shown in FIG. 3, which shows the processing configuration for generating the target path and setting the target speed value of the autonomous vehicle, is described on the basis of FIG. 3 to FIG. 7.

In step S11, various types of information are acquired, and processing then advances to step S12. More specifically, information on the seating signal (presence or absence of an occupant) is acquired by the seating sensor 9. First landmark information that defines a travel path boundary as the actual environment is acquired from data from the recognition sensor 1. In addition, data from the GPS 2 and map data 4 are compared, and second landmark information that defines travel path boundaries for both sides of the route is acquired. Other information such as route information is also acquired.

Here, the first landmark information and the second landmark information are used for different purposes. The first landmark information is used for portions in which the recognition sensor 1 can detect the first landmark information in the vicinity of the host vehicle. The second landmark information is used for portions in which the recognition sensor 1 cannot detect the first landmark information due to occlusion or being a long distance from the host vehicle. "Occlusion" means that the first landmark is obstructed by an obstacle, etc. and cannot be recognized by the recognition sensor 1.

Moreover, for example, as shown in FIG. 4A and FIG. 5A, in an area without landmarks defining the travel path boundary, interpolation is implemented from landmark information (first landmark information and second landmark information) that can be acquired. More specifically, as shown in FIG. 4A, in a scene in which an oncoming vehicle A2 is traveling on a road that does not have a center line and is not established as a one-way traffic road, if only a road width RW can be obtained as first landmark information, half the width of the road width RW is set as a travel path C as shown in FIG. 4B. Also, as shown in FIG. 5A, in a road scene such as one in which the landmark information in the center of an intersection or a T-shaped road junction disappears, interpolation is performed using first landmark information M1 around where the landmark information disappears and second landmark information M2 of an opposite side with respect to the route. Namely, in this type of case, as shown in FIG. 5B, the pieces of landmark information are smoothly connected by a spline curve or a polynomial function or other such curve expression.

In step S12, which follows the acquisition of various types of information in step S11, the presence or absence of an occupant is determined on the basis of the seating signal acquired in step S11. If YES (occupant is present), the processing advances to step S13, and if NO (no occupant is present), the processing advances to step S14. Step S12 corresponds to the occupant determination unit 51.

Here, "occupant" refers to a driver or a passenger. "Occupant is present" refers to a case in which at least any one person is present in the host vehicle, and that person can be the driver or a passenger. "No occupant is present" refers to a case in which neither the driver nor a passenger is present in the host vehicle. Examples of cases of "no occupant is present" include a case in which a Robot Taxi (registered trademark) is dispatched to pick up a customer, and a case in which the vehicle is returning to a parking lot after dropping off a customer. The presence or absence of an occupant in this step S12 involves determining the actual presence or absence of an occupant.

In step S13, which follows the determination in step S12 that an occupant is present, a path curvature function $w_\rho$ (described hereunder) is set relatively large as a first weight setting signal, and the processing advances to step S15. Here, by setting the path curvature function $w_\rho$ to be relatively large, processing is performed so that a penalty for the path curvature increasing, also increases. Step S13 corresponds to the first weight setting unit 52.

In step S14, which follows the determination in step S12 that no occupant is present, weights $w_{yL}$ and $w_{yR}$ (described hereunder) of a margin function with respect to the travel path boundaries are set relatively large as second weight setting signals, and processing advances to step S15. Here, by setting the weights $w_{yL}$ and $w_{yR}$ of the margin function with respect to the travel path boundaries to be relatively large, processing is performed so that a penalty for approaching a travel path boundary increases. Step S14 corresponds to the second weight setting unit 53.

In step S15, which follows the setting of the path curvature function $w\rho$ in step S13, or the setting of the weights $w_{yL}$ and $w_{yR}$ of the margin function with respect to the travel path boundaries in step S14, the first target path or the second target path is generated by the evaluation function H, and the processing advances to step S16. Step S15 corresponds to the target path generating unit 54.

Here, the detailed processing of step S15 is described using FIG. 6. For example, in the left curving road of FIG. 6, the path length is denoted by S, and the differential of the path length is denoted by ds. A margin function with respect to the travel path boundary of the left side at each point of the path is denoted by yL(s), and for the functions relating to right side position and orientation information at each point of the path, the margin function with respect to the travel path boundary is denoted by yR(s), and the path curvature function at each point of the path is denoted by $\rho(s)$. Furthermore, when the function relating to the path end point is denoted by $f_s(x,y,\theta)$, the evaluation function H is expressed by the following equation (1).

$$H=w_s \cdot f_s(x,y,\theta)+\int_0^s \{w_{yL} \cdot yL(s)+w_{yR} \cdot yR(s)+w_\rho \cdot \rho(s)\}ds \quad (1)$$

In equation (1), $w_{yL}$ denotes the weight of the margin function with respect to the left side travel path boundary, $w_{yR}$ denotes the weight of the margin function with respect to the right side travel path boundary, $w_\rho$ denotes the path curvature function, and ws denotes the weight of the function relating to the path end point. The problem of minimizing the abovementioned evaluation function H is solved by combining a vehicle model with equation (1). Here, yL(s), yR(s), $\rho(s)$, and $f_s(x,y,\theta)$ are expressed as first-order differentiable functions. In addition, the abovementioned equation (1) is not limited to a left curving road; application to a right curving road, an S-shaped road, a straight road, or other such road is possible.

In step S16, which follows the generation of the first target path or the second target path in step S15, a target speed value corresponding to each path point of the first target path or the second target path is set (stored), and processing proceeds to the end. Step S16 corresponds to the target speed setting unit 55.

Here, the detailed processing of step S16 is described using FIG. 7. For example, in FIG. 7, the position of the host vehicle at the point in time that the target path is to be generated is used as a starting point, and the coordinates are set with x being the direction in which the host vehicle is traveling as x, and y being the width direction of the host vehicle. Moreover, each node constituting the path is recorded as two-dimensional coordinate information of $x_i$ and $y_i$, along with curvature information $\rho_i$ calculated from longitudinal node information, and speed information $v_i$ when passing through each node. Each piece of information is recorded in a recording unit (not illustrated).

Here, the speed information $v_i$ is determined on the basis of the curvature information $\rho_i$ such that the lateral G and yaw rate that are generated do not become excessive. For example, the maximum lateral G and the maximum yaw rate (lateral acceleration limit and yaw rate limit of the host vehicle) are preset as $Gy_{max}$ and $y_{max}$ respectively, and the speed information with respect to the node of the largest curvature from amongst the nodes constituting the generated target path is calculated using equation (2) as follows.

$$v_{min}=\min(\sqrt{Gy_{max}/\max(|\rho_i|)}, y_{max}/\max(|\rho_i|)) \quad (2)$$

This target speed value is stored in the applicable speed information $v_i$. That is, the target speed value is stored in the speed information $v_i$, for each node in the form of being continuously connected in a range of $Gx_{max}$, which is a preset maximum longitudinal G (maximum longitudinal G), and the target speed for each node is calculated. Here, the "lateral acceleration limit and yaw rate limit of the host vehicle" are preset through, inter alia, experimentation for each vehicle model. This same applies to the maximum longitudinal G.

The action is described next. The description of the action of the first embodiment is divided into "processing action for generating the target path and setting the target speed value of an autonomous vehicle" and "characteristic action for generating a target path for an autonomous vehicle".

Processing Action for Generating the Target Path and Setting the Target Speed Value of an Autonomous Vehicle The processing action for generating the target path and setting the target speed value of an autonomous vehicle is described below on the basis of the flowchart of FIG. 3. The processing operation for generating the target path and setting the target speed value of an autonomous vehicle is also described on the basis of an operation example shown in FIG. 8.

First, when an occupant is present, processing advances in the order of step S11→step S12→step S13→step S15→step S16→End. At this time, in step S13, the path curvature function $w\rho$ is set relatively large, and thereby processing is performed so that a penalty for the path curvature increasing, also increases. That is, in step S13, the path curvature is set to be small, and the path curvature function $w\rho$ is set so that the radius of curvature increases. In other words, when an occupant is present, emphasis is placed on the magnitude of vehicle movement of the host vehicle. Therefore, in step S15, a first target path that suppresses vehicle movement within a restriction of the travel environment is generated by the evaluation function H. Accordingly, when an occupant is present, a first target path is generated with priority on reducing the sense of discomfort felt by the occupant. Furthermore, from the path curvature of the generated first target path, the target speed value is set in step S16 to a speed that does not exceed the lateral acceleration limit and yaw rate limit set in advance for the host vehicle. That is, the target speed value is set in a range in which the first target path can be safely traveled.

Next, when no occupant is present, processing advances in the order of step S11→step S12→step S14→step S15→step S16→End. At this time, the weights wyL and wyR of the margin function with respect to the travel path boundaries are set to be relatively large in step S14, and thereby processing is performed so that a penalty for approaching a travel path boundary increases. That is, in step S14, the weights $w_{yL}$ and $w_{yR}$ of the margin function are set so that margin maximums are obtained with respect to the right and left boundaries of the travel path (road). In other words, when no occupant is present, emphasis is placed on the margin allowance with the surrounding environment of the host vehicle. Therefore, in step S15, a second target path for which the safety margin is widened with respect to the travel environment is generated by the evaluation function H. Accordingly, when no occupant is present, a second target path is generated with priority of ensuring margins with respect to each environmental factor in the surroundings of the host vehicle. Furthermore, from the path curvature of the generated second target path, the target speed value is set in step S16 to a speed that does not exceed the lateral acceleration limit and yaw rate limit preset for the host vehicle. That is, the target speed value is set at a range in which the second target path can be safely traveled.

Next, processing operations for generating a target path and setting a target speed value for an autonomous vehicle are described. For example, in the generation of a target path and the setting of a target speed value when turning on a curved road (corner road, left curving road) as shown in FIG. 8, processing operations differ between when an occupant is present and no occupant is present.

Figure 8:
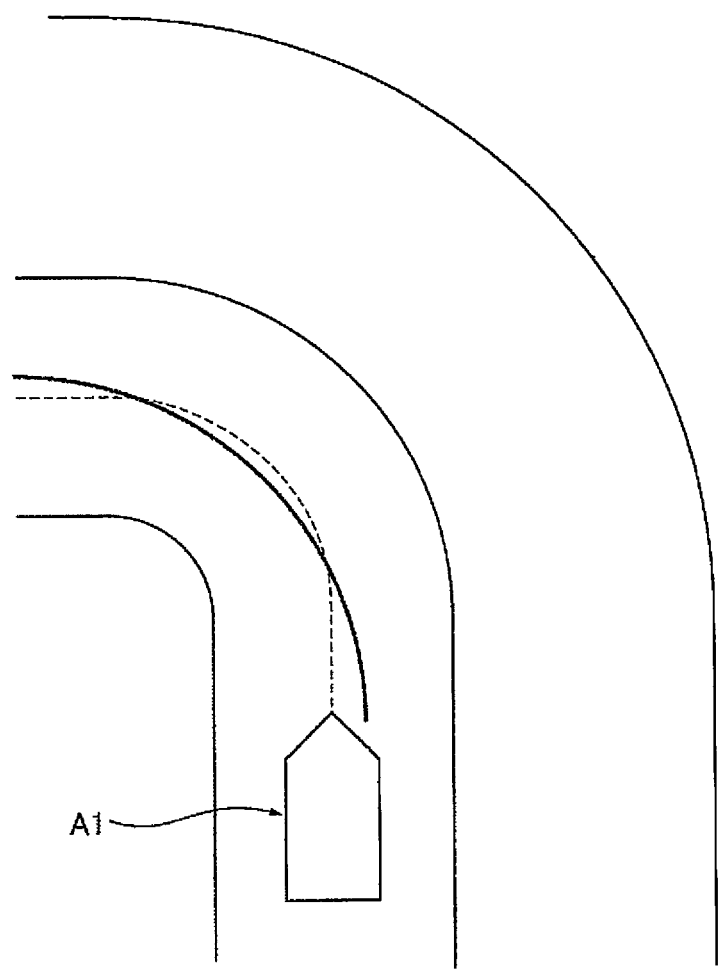
FIG. 8 is a diagram of an operation example of a processing operation for generating a target path and setting a target speed value for an autonomous vehicle of the first to fourth embodiments.

As shown in FIG. 8, the first target path (solid line) when an occupant is present becomes a path on which the host vehicle A1 enters the curve from the outer side, and exits the curve from the outer side ("out-in-out path"). As shown in FIG. 8, the second target path (dashed line) when no occupant is present involves travel in the middle between the right and left boundaries defining the travel lane. Therefore, for travel on the same road, a difference is imparted in the target path depending on whether an occupant is present or not present. More specifically, with a curved road like that of FIG. 8, the path curvature of the second target path becomes larger than the path curvature of the first target path. That is, the radius of curvature of the second target path becomes smaller than the radius of curvature of the first target path (the second target path becomes a sharp curve). In other words, the radius of curvature of the first target path becomes smaller than the radius of curvature of the second target path. Therefore, with the first target path for when an occupant is present, a first target path that allows travel with ordinary driving by the driver is generated. The path curvature of the first target path is set in a range in which the host vehicle does not depart from the right and left boundaries.

Also, with a curved road like that of FIG. 8, the path curvature differs between the first target path and the second target path, and therefore the target speed value also differs between when an occupant is present and when no occupant is present. That is, the path curvature of the second target path is greater than the path curvature of the first target path, and therefore, from the lateral acceleration limit and yaw rate limit preset for the host vehicle, the target speed value of the second target path is set to be smaller than the target speed value of the first target path. In other words, the target speed value for the first target path for when an occupant is present is set larger than the target speed value of the second target path for when no occupant is present, and therefore the actual vehicle speed is also greater along the first target path. The same applies for a right curving road that is opposite the left curving road shown in FIG. 8. The same also applies for a curved road with a gentler curve than the curved road shown in FIG. 8.

Furthermore, the second target path is a path that involves travel in the middle between the right and left boundaries. Therefore, for the second target path, a target path is generated such that the distance between the host vehicle and the right and left boundaries becomes longer than that of the first target path. Thus, when no occupant is present, a second target path can be generated that maximally ensures, with respect to travel lane departure, a margin allowance that can be produced for reasons such as control error. Moreover, because the second target path for travel in the middle between the right and left boundaries is generated when no occupant is present, a margin allowance can be ensured for instances such as the sudden appearance of a pedestrian. In addition, with the second target path for when no occupant is present, the target speed value is set lower than the target speed of the first target path for when an occupant is present, and therefore the actual vehicle speed is also lower. Thus, the second target path is generated as a path that is safer than the first target path.

As described above, when an occupant is present, a first target path is generated with priority on reducing the sense of discomfort felt by the occupant. On the other hand, when no occupant is present, an occupant that would feel the sense of discomfort when riding in the vehicle is not present, and therefore a second target path is generated with priority on ensuring margins with respect to each environmental factor in the surroundings of the host vehicle.

Characteristic Action for Generating a Target Path for an Autonomous Vehicle

In the first embodiment, the presence or absence of an occupant is determined. When it is determined that an occupant is present, a first target path is generated, and when it is determined that no occupant is present, a second target path is generated. A difference is imparted between the first target path and the second target path. Here, ordinarily in the case of an autonomous driving system with both manned driving and unmanned driving modes through independent travel like that of an unmanned taxi, the vehicle travels in the middle between right and left boundaries. In addition, ordinarily, the same path is always generated with both manned driving and unmanned driving. However, in the case of maimed driving, the occupant may feel a sense of discomfort along the path. On the other hand, in the first embodiment, the first target path when an occupant is present differs from the second target path when no occupant is present. Therefore, when an occupant is present, a target path along which the occupant does not feel a sense of discomfort can be generated. As a result, an appropriate target path is generated according to the presence or absence of an occupant. In addition, by generating an appropriate target path according to the presence or absence of an occupant, both travel suited for an occupant when an occupant is present, and travel suited for the absence of an occupant when no occupant is present are made possible.

In the first embodiment, the second target path is generated as a target path for which the distance between the host vehicle and the right and left boundaries is longer than that of the first target path. That is, when no occupant is present, a second target path is generated with priority on ensuring margins with respect to each environmental factor in the surroundings of the host vehicle. Accordingly, when no occupant is present, a second target path is generated that maximally ensures, with respect to travel lane departure, a margin allowance that can be produced for reasons such as control error.

In the first embodiment, the first target path is generated as a target path for which the path curvature calculated from individual points constituting the target path is smaller than that of the second target path. That is, when an occupant is present, a first target path is generated with priority on reducing the sense of discomfort felt by the occupant. Accordingly, when an occupant is present, a first target path that allows travel with ordinary driving by the driver is generated. For example, an "out-in-out path" like that shown by the solid line in FIG. 8 is generated as the first target path when turning at a corner.

In the first embodiment, when the first target path and the second target path are generated, a value of a target speed when traveling on a curved road is set. This target speed value is set to a speed that does not exceed the limits of either the lateral acceleration limit or the yaw rate limit set in advance for the host vehicle. For example, when attention is focused on road boundaries and obstacles to a host vehicle, suppression of acceleration/deceleration control as described in JP-A 2001-001787 results in a loss of responsiveness to the target speed value. Therefore, during unmanned driving, the vehicle ultimately operates in a safe direction with regard to longitudinal movement (longitudinal G), but lateral movement (lateral G) is not considered. In contrast, in the first embodiment, the target speed value when traveling on a curved road is set to a speed that does not exceed the limits of either the lateral acceleration limit or the yaw rate limit set in advance for the host vehicle. That is, even if the curvature of the target path differs depending on the presence or absence of an occupant, the target speed value is set to a speed that does not exceed the limits of both the lateral acceleration limit and the yaw rate limit set in advance for the host vehicle. Accordingly, regardless of the presence or absence of an occupant, excessive vehicle movement generated when turning along a curve is suppressed.

Next, effects shall be described. The effects presented below can be achieved with the method and device for generating a target path for an autonomous vehicle of the first embodiment.

(1) A controller (recognition determination processor 3 for autonomous driving) for generating a target path that can be tracked by a host vehicle, that does not deviate from a road, and that involves no contact with an obstacle is provided. With the method for generating a target path for an autonomous vehicle, determining a presence or absence of an occupant.

Generating a first target path upon determining that the occupant is present.

Generating a second target path upon determining no occupant is present.

Imparting a difference in target path between the first target path and the second target path. Therefore, a method for generating a target path for an autonomous vehicle, whereby an appropriate target path is generated according to the presence or absence of an occupant can be provided.

(2) The second target path is generated as a target path for which the distance between the host vehicle and the right and left boundaries defining the travel lane is longer than that of the first target path. Therefore, in addition to the effect of (1), when no occupant is present, it is possible to generate a second target path that maximally ensures, with respect to travel lane departure, a margin allowance that can be generated for reasons such as control error.

(3) The first target path is generated as the target path for which the path curvature calculated from individual points constituting the target path is smaller than that of the second target path. Therefore, in addition to the effects of (1) and (2), when an occupant is present, it is possible to generate a first target path that allows travel with ordinary driving by the driver.

(4) When the first target path and the second target path are to be generated, a target speed value for travel along a curved road is set. The target speed value is set to a speed not exceeding at least one of a lateral acceleration limit and a yaw rate limit, set in advance for the host vehicle. Therefore, in addition to the effects of (1) to (3), regardless of the presence or absence of an occupant, excessive vehicle movement that is generated when turning along a curve can be suppressed.

(5) A controller (recognition determination processor 3 for autonomous driving) for generating a target path that can be tracked by a host vehicle, that does not deviate from a road, and that involves no contact with an obstacle is provided. With this target path generating device for an autonomous vehicle, the controller (recognition determination processor 3 for autonomous driving) has an occupant determining means (occupant determination unit 51). The controller (recognition determination processor 3 for autonomous driving) also has a first target path generating means (first weight setting unit 52, target path generating unit 54) and a second target path generating means (second weight setting unit 53, target path generating unit 54). The occupant determining means (occupant determination unit 51) determines the presence or absence of an occupant. Upon determining by the occupant determining means (occupant determination unit 51) that an occupant is present, the first target path generating means (first weight setting unit 52, target path generating unit 54) generates a first target path. Upon determining by the occupant determining means (occupant determination unit 51) that no occupant is present, the second target path generating means (second weight setting unit 53, target path generating unit 54) generates a second target path. A difference is imparted in the target path between the first target path generated by the first target path generating means (first weight setting unit 52, target path generating unit 54) and the second target path generated by the second target path generating means (second weight setting unit 53, target path generating unit 54). Therefore, a device for generating a target path for an autonomous vehicle whereby an appropriate target path is generated according to the presence or absence of an occupant can be provided.

Second Embodiment

The second embodiment is a case in which the presence or absence of an occupant is determined by the seating position of an occupant.

First, the configuration is described. A method and device for generating a target path for an autonomous vehicle in the second embodiment are applied to an autonomous vehicle for which steering, driving, and braking can be externally controlled, the autonomous vehicle being based on a motor-driven hybrid vehicle (one example of an electric-powered vehicle). The description of the configuration of the second embodiment below is divided into an "autonomous driving system configuration", a "detailed configuration of a recognition determination processor for autonomous driving" and a "processing configuration for generating a target path and setting a target speed value for an autonomous vehicle".

Autonomous Driving System Configuration

Figure 9:
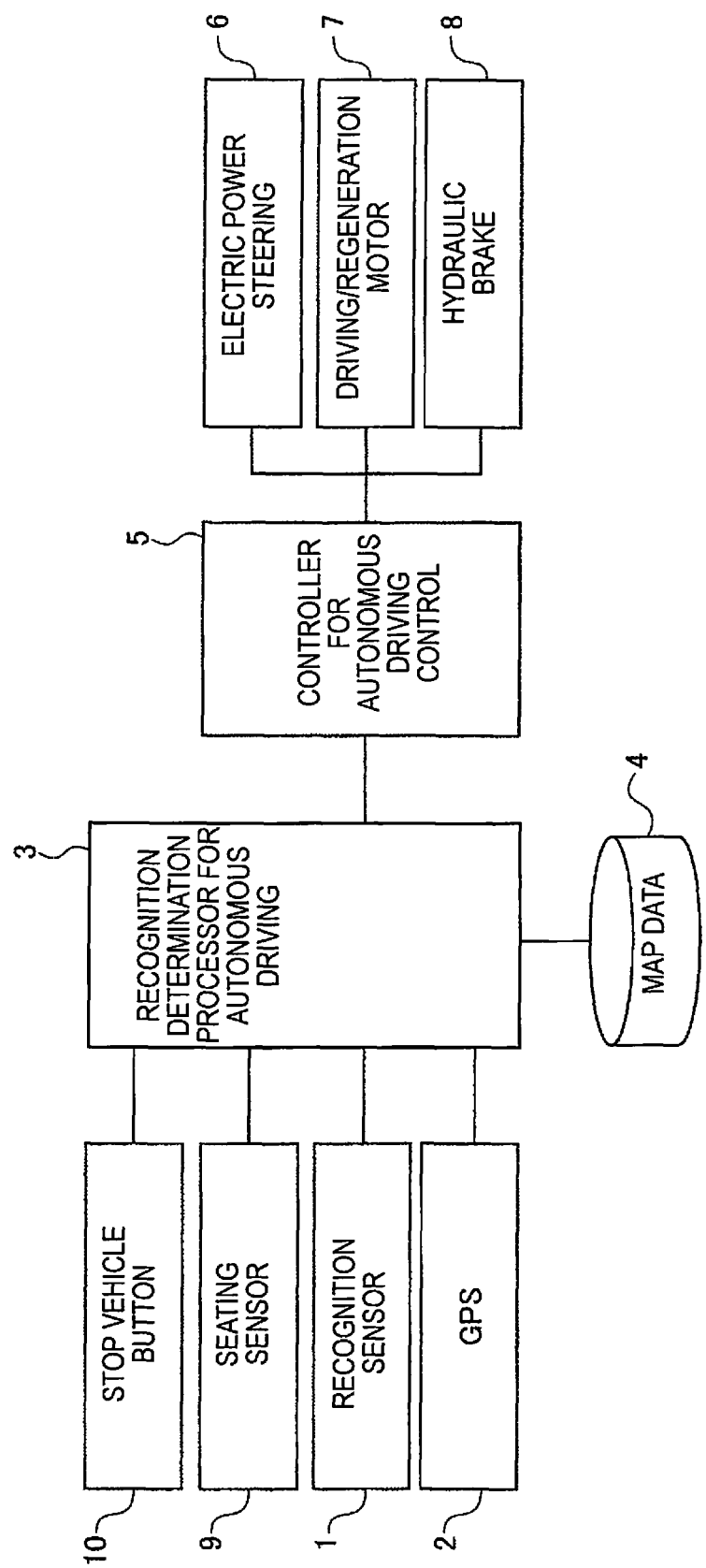
FIG. 9 is an overall configuration drawing illustrating an autonomous driving system configuration for an autonomous vehicle in which a method and a device are applied for generating a target path for an autonomous vehicle of the second embodiment.

FIG. 9 shows an autonomous driving system configuration of an autonomous vehicle in which the method and device for generating a target path for an autonomous vehicle of the second embodiment are applied. The overall configuration of the autonomous driving system is described below on the basis of FIG. 9.

The autonomous driving system is provided with a recognition sensor 1, a GPS 2, a recognition determination processor 3 (controller) for autonomous driving, and map data 4. The autonomous driving system is also provided with a controller 5 for autonomous driving control, electric power steering 6, a driving/regeneration motor 7, a hydraulic brake 8, a seating sensor 9, and a stop vehicle button 10 (onboard operation device).

The seating sensor 9 is attached to a seat in the vehicle, and detects pressure encountered when an occupant is seated. The seating sensor 9 also detects at which position the occupant is seated. For example, the seating sensor 9 detects whether the occupant is seated in the driver's seat, the front passenger's seat, or a rear passenger's seat. Through this, the presence or absence of an occupant is determined.

The stop vehicle button 10 is a button that can stop the host vehicle through operation of the button. This stop vehicle button 10 is provided, for example, at a center section of the instrument panel in the vehicle width direction. The arrangement of this stop vehicle button 10 is recorded in, inter alia, the recognition determination processor 3 for autonomous driving.

The other configurations are the same as those of the first embodiment, and therefore corresponding configurations are assigned the same reference numerals, and descriptions thereof are omitted.

Detailed Configuration of Recognition Determination Processor for Autonomous Driving The occupant determination unit 51 (occupant determining means, occupant seating position determining means) receives a seating signal and an occupant seating position signal from the seating sensor 9, and determines the presence or absence of an occupant on the basis of the seating signal and the occupant seating position signal. The other configurations are the same as those of the first embodiment, and therefore illustrations and descriptions thereof are omitted.

Figure 10:
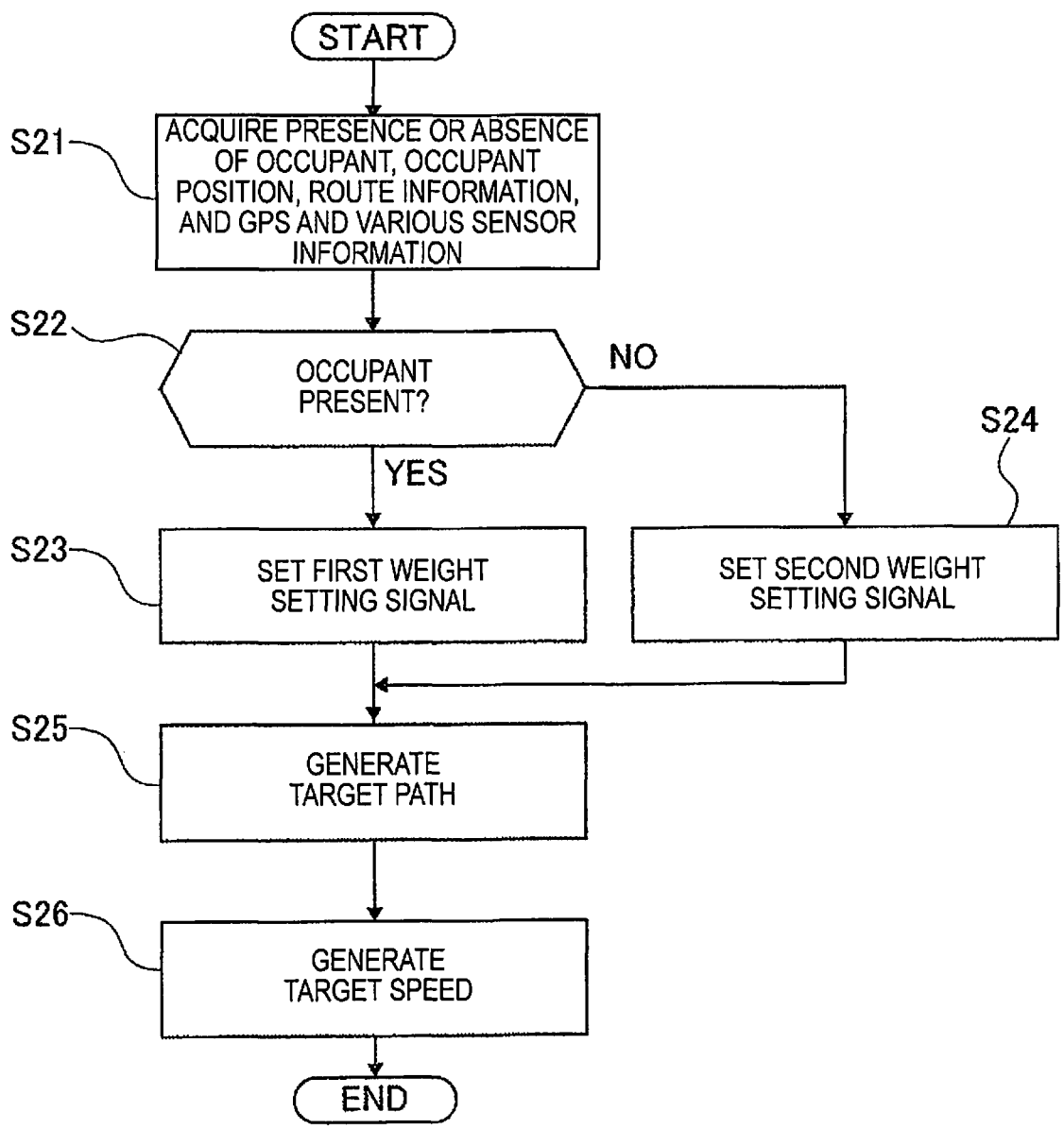
FIG. 10 is a flowchart illustrating the flow of target path generation process and target speed value setting process for an autonomous vehicle, executed by a recognition determination processor for autonomous driving of the second embodiment.

Processing Configuration for Generating a Target Path and Setting a Target Speed Value for an Autonomous Vehicle FIG. 10 shows the flow of target path generation process and target speed value setting process for an autonomous vehicle, executed by a recognition determination processor for autonomous driving of the second embodiment. In the flowchart of FIG. 10, the method for setting the route, and the matter of the GPS 2 and map data 4 being high precision elements are the same as in FIG. 3, and therefore descriptions thereof are omitted. Each step in the flowchart shown in FIG. 10, which shows the processing configuration for generating a target path and setting a target speed value of an autonomous vehicle, is described on the basis of FIG. 10.

In step S21, various types of information are acquired, and processing then advances to step S22. More specifically, information on the seating signal (presence or absence of an occupant) and occupant seating position signal (occupant position) is acquired by the seating sensor 9. Other information and details, etc., are the same as in step S11, and therefore a description thereof is omitted.

Step S22 follows the acquisition of various information in step S21, and in step S22, the presence or absence of an occupant is determined on the basis of the seating signal and seating position signal acquired in step S21. If YES (occupant is present), the processing advances to step S23, and if NO (no occupant is present), the processing advances to step S24. Step S22 corresponds to the occupant determination unit 51.

More specifically, in step S22, when the presence or absence of an occupant is to be determined, it is determined that an occupant is present when the seating position of the occupant is a position at which an onboard operation device can be operated. Moreover, in step S22, when the presence or absence of an occupant is to be determined, it is determined that no occupant is present when the seating position of the occupant is a position at which the onboard operation device cannot be operated. For a case in which no occupant is actually present in the host vehicle, it is determined that no occupant is present. The presence or absence of an occupant in this step S22 is not the actual presence or absence of an occupant, but rather the presence or absence of an occupant from a control perspective. Therefore, even if an occupant is actually in the host vehicle, from a control perspective, the occupant can be determined as not being present in the host vehicle (no occupant is present).

Here, the matter of the "seating position of the occupant is a position at which an onboard operation device can be operated" means that the seating position of the occupant is the driver's seat position or the front passenger's seat position (namely, a seat position at the front of the vehicle interior), which are near the stop vehicle button 10. Therefore, a case in which the seating position of the occupant is the driver's seat position or the front passenger's seat position is considered to be a case in which backup through a stop vehicle command is possible, and therefore it is determined that an occupant is present. Moreover, even a case in which the occupant is operating (touching) the stop vehicle button 10 to ON or OFF is considered to be a case in which backup through a stop command is possible, and therefore it is determined than an occupant is present.

On the other hand, the matter of the "seating position of the occupant is a position at which an onboard operation device cannot be operated" means that the seating position of the occupant is a rear passenger's seat position (that is, a seat position at the rear of the vehicle interior) that is not close to the stop vehicle button 10. Therefore, a case in which the seating position of the occupant is a rear passenger's seat position is considered to be a case in which backup through a vehicle stop command would be difficult, and therefore it is determined that no occupant is present. Moreover, even a case in which the occupant is not operating (not touching) the stop vehicle button 10 to ON or OFF is considered to be a case in which backup through a stop command would be difficult, and therefore it is determined than no occupant is present.

The other steps S23 to S26 correspond to steps S13 to S16, respectively, and therefore descriptions thereof are omitted.

The action is described next. Similar to the first embodiment, the description of the action of the second embodiment is divided into "processing action for generating a target path and setting a target speed value of an autonomous vehicle" and "characteristic action for generating a target path for an autonomous vehicle". As shall be apparent, each of the steps S11 to S16 of the first embodiment is changed to be read as steps S21 to S26, respectively. Moreover, in the case of the action of the second embodiment, the following characteristic action of the second embodiment is shown.

In the second embodiment, when the presence or absence of an occupant is to be determined, it is determined that an occupant is present when the seating position of the occupant is a position at which an onboard operation device can be operated, and it is determined that no occupant is present when the seating position of the occupant is a position at which an onboard operation device cannot be operated. That is, when the seating position of the occupant is a position at which an onboard operation device cannot be operated, it is determined that no occupant is present, and therefore even if an occupant is actually present in the host vehicle, a second target path is generated for a case in which it would be difficult to immediately perform backup through an onboard operation device. This second target path is a target path that prioritizes ensuring margins with respect to each environmental factor in the surroundings of the host vehicle. Accordingly, even if an occupant is actually present in the host vehicle, a margin allowance with respect to travel lane departure is maximally ensured for a case in which a backup system cannot be immediately operated through an onboard operation device due to the seating position of the occupant.

Next, effects shall be described. The effects described in (1) to (5) for the first embodiment are obtained with the method and device for generating a target path for an autonomous vehicle of the second embodiment. In addition, the following effect (6) can also be obtained with the method for generating a target path for an autonomous vehicle of the second embodiment.

(6) When the presence or absence of an occupant is to be determined, it is determined that an occupant is present when the seating position of the occupant is a position at which an onboard operation device can be operated, and it is determined that no occupant is present when the seating position of the occupant is a position at which an onboard operation device cannot be operated.

Therefore, even if an occupant is actually present in the host vehicle, a margin allowance with respect to travel lane departure can be maximally ensured for a case in which a backup system through an onboard operation device cannot be immediately operated due to the seating position of the occupant.

Third Embodiment

The third embodiment is a case in which the presence or absence of an occupant is determined by the seating position of an occupant and a driving aptitude of the occupant.

First, the configuration shall be described. A method and device for generating a target path for an autonomous vehicle in the third embodiment are applied to an autonomous vehicle for which steering, driving, and braking can be externally controlled, the autonomous vehicle being based on a motor-driven hybrid vehicle (one example of an electric-powered vehicle). The description of the configuration of the third embodiment below is divided into an "autonomous driving system configuration", a "detailed configuration of a recognition determination processor for autonomous driving" and a "processing configuration for generating a target path and setting a target speed value for an autonomous vehicle".

Autonomous Driving System Configuration

Figure 11:
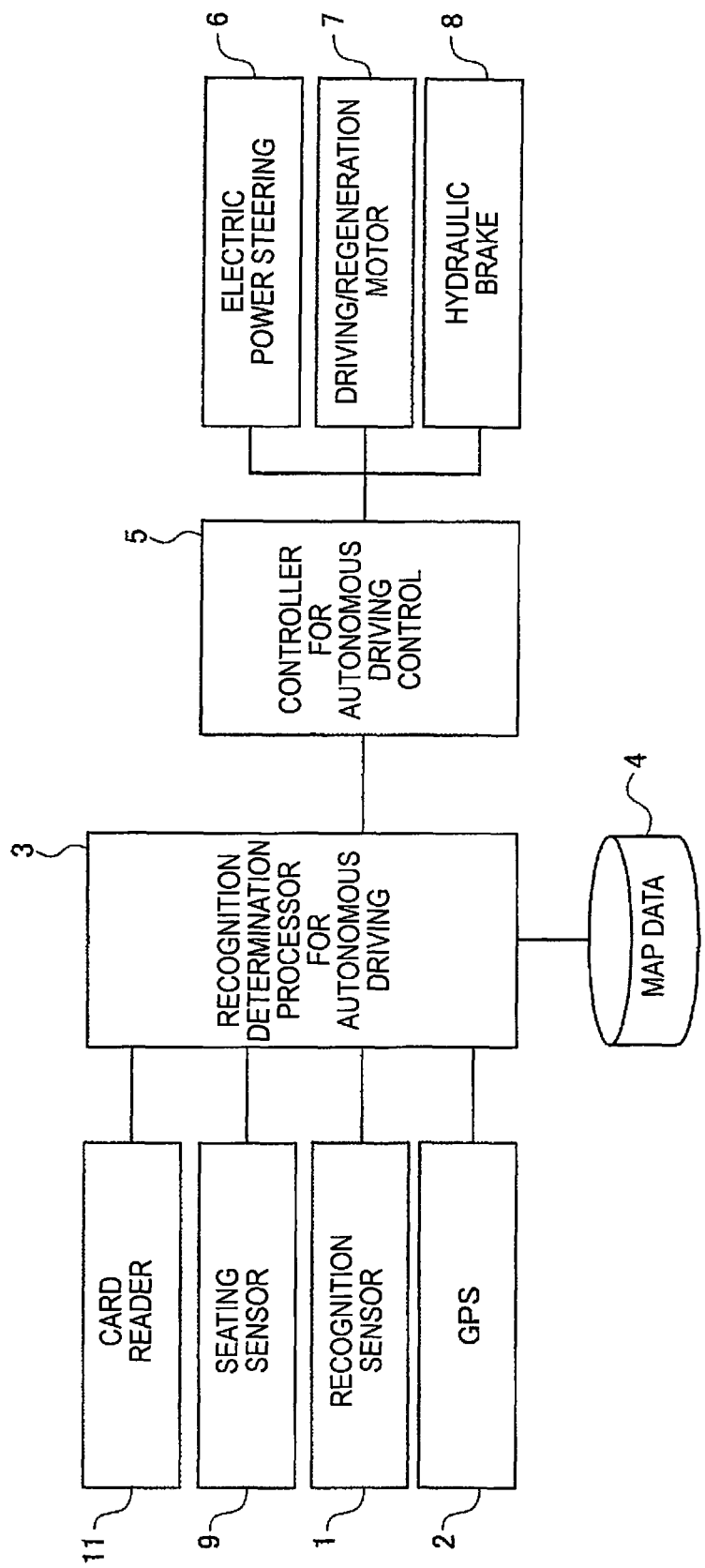
FIG. 11 is an overall configuration drawing illustrating an autonomous driving system configuration for an autonomous vehicle in which a method and a device are applied for generating a target path for an autonomous vehicle of the third embodiment.

FIG. 11 shows an autonomous driving system configuration of an autonomous vehicle in which the method and device for generating a target path for an autonomous vehicle of the third embodiment are applied. The overall configuration of the autonomous driving system is described below on the basis of FIG. 11.

The autonomous driving system is provided with a recognition sensor 1, a GPS 2, a recognition determination processor 3 (controller) for autonomous driving, and map data 4. The autonomous driving system is also provided with a controller 5 for autonomous driving control, electric power steering 6, a driving/regeneration motor 7, a hydraulic brake 8, a seating sensor 9, and a card reader 11. A brake pedal and steering wheel (handle) are provided as onboard operation devices at the driver's seat of the vehicle.

The seating sensor 9 is attached to a seat in the vehicle, and detects pressure encountered when an occupant is seated. The seating sensor 9 also detects at which position the occupant is seated. For example, the seating sensor 9 detects whether the occupant is seated in the driver's seat, the front passenger's seat, or a rear passenger's seat. Through this, the presence or absence of an occupant is determined.

In order to read and acquire driving aptitude information of an occupant, the card reader 11 reads a card on which registered information is recorded. Examples of registered information include the presence or absence of a driver's license, the type of driver's license, and age. This card must be pre-registered before the occupant boards the vehicle.

The other configurations are the same as those of the first embodiment, and therefore corresponding configurations are assigned the same reference numerals, and descriptions thereof are omitted.

Detailed Configuration of Recognition Determination Processor for Autonomous Driving The occupant determination unit 51 (occupant determining means, occupant seating position determining means, and occupant driving aptitude determining means) receives a seating signal and an occupant seating position signal from the seating sensor 9. The occupant determination unit 51 also receives driving aptitude information of the occupant from the card reader 11. The occupant determination unit 51 then determines the presence or absence of an occupant on the basis of the seating signal, the occupant seating position signal, and the driving aptitude information for the occupant. The other configurations are the same as those of the first embodiment, and therefore illustrations and descriptions thereof are omitted.

Figure 12:
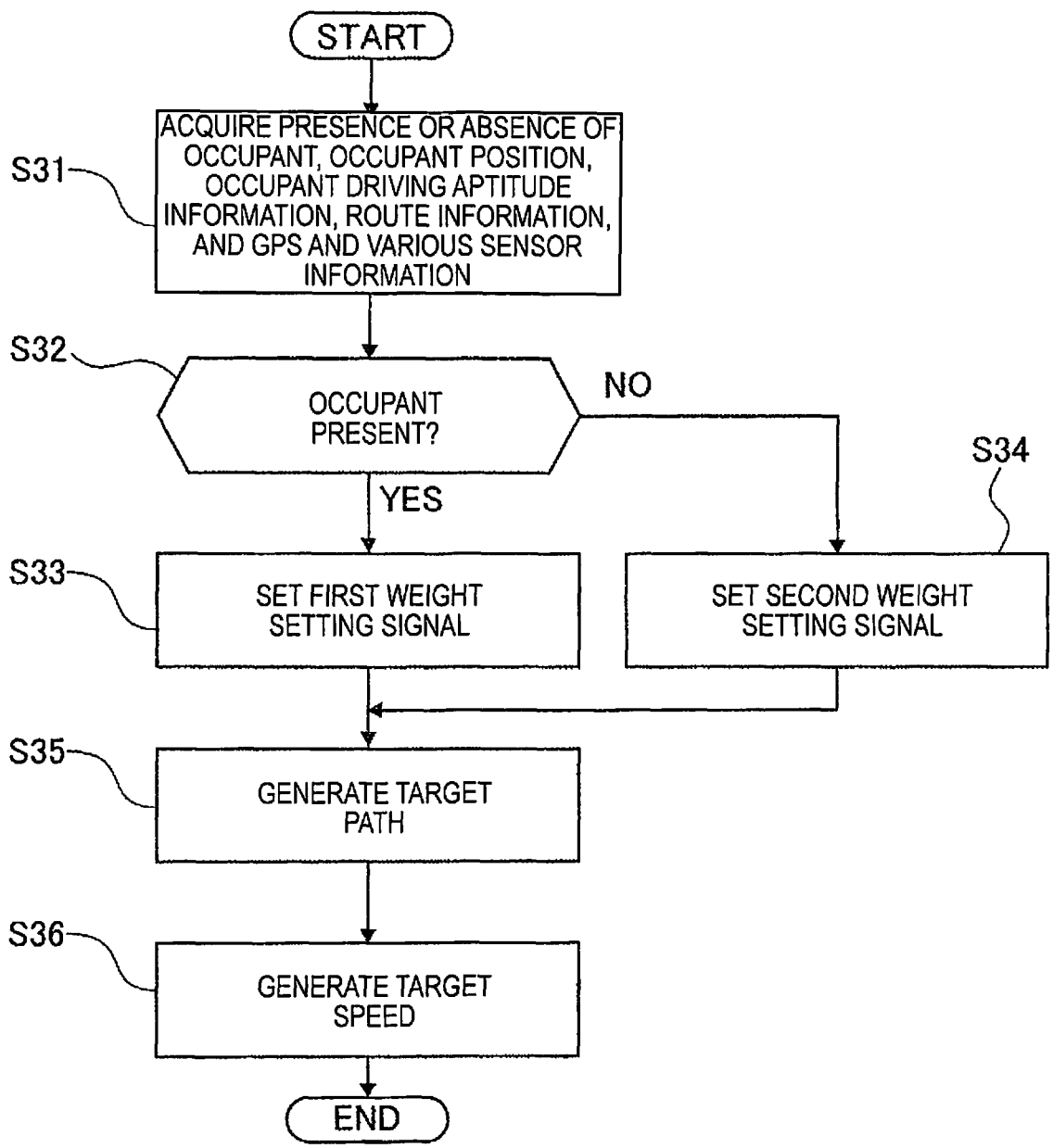
FIG. 12 is a flowchart illustrating the flow of target path generation process and target speed value setting process for an autonomous vehicle, executed by a recognition determination processor for autonomous driving of the third embodiment.

Processing Configuration for Generating a Target Path And Setting a Target Speed Value for an Autonomous Vehicle FIG. 12 shows the flow of target path generation process and target speed value setting process for an autonomous vehicle, executed by a recognition determination processor for autonomous driving of the third embodiment. In the flowchart of FIG. 12, the method for setting the route, and the matter of the GPS 2 and map data 4 being high precision elements are the same as in FIG. 3, and therefore descriptions thereof are omitted. Each step in the flowchart shown in FIG. 12, which shows the processing configuration for generating a target path and setting a target speed value of an autonomous vehicle, is described on the basis of FIG. 12.

In step S31, various types of information are acquired, and processing then advances to step S32. More specifically, information on the seating signal (presence or absence of an occupant) and occupant seating position signal (occupant position) is acquired by the seating sensor 9. Moreover, driving aptitude information of the occupant (occupant driving aptitude information) is acquired by the card reader 11. Other information and details, etc., are the same as in step S11, and therefore a description thereof is omitted.

Step S32 follows the acquisition of various types of information in step S31, and in step S32, the presence or absence of an occupant is determined on the basis of the seating signal, seating position signal, and occupant driving aptitude information acquired in step S31. If YES (occupant is present), the processing advances to step S33, and if NO (no occupant is present), the processing advances to step S34. Step S32 corresponds to the occupant determination unit 51.

More specifically, in step S32, when the presence or absence of an occupant is to be determined, it is determined that an occupant is present when the seating position of the occupant is a position at which an onboard operation device can be operated, and the occupant has driving aptitude. That is, it can be considered that backup is possible when an occupant having skill that enables backup through the use of an onboard operation device is seated in the vehicle in a seating position at which backup can be performed. Moreover, in step S32, when the presence or absence of an occupant is to be determined, it is determined that no occupant is present when the seating position of the occupant is a position at which the onboard operation device cannot be operated, or the occupant does not have driving aptitude. For a case in which no occupant is actually present in the host vehicle, it is determined that no occupant is present. The presence or absence of an occupant in this step S32 is not the actual presence or absence of an occupant, but rather the presence or absence of an occupant from a control perspective. Therefore, even if an occupant is actually in the host vehicle, from a control perspective, the occupant can be determined as not being present in the host vehicle (no occupant is present).

Here, the matter of the "seating position of the occupant is a position at which an onboard operation device can be operated" means that the seating position of the occupant is the driver's seat. Moreover, the matter of the "occupant has driving aptitude" means that the occupant has a driver's license allowing driving of the host vehicle. For example, for a case in which the occupant has an ordinary driver's license with the qualifications for driving the host vehicle, if the matter of having an ordinary driver's license is registered in the driving aptitude information of the occupant, it is determined that the "occupant has driving aptitude". That is, for a case of determining that an occupant is present, it can be considered that backup is possible when an occupant having skill that enables backup through an onboard operation device is seated at a seating position from which backup is possible.

On the other hand, the matter of the "seating position of the occupant is a position at which an onboard operation device cannot be operated" means that the seating position of the occupant is the front passenger's seat position or the rear passenger's seat position. Moreover, the matter of the "occupant does not have driving aptitude" means that no occupant has a driver's license allowing the occupant to drive the host vehicle. For example, for a case in which the occupant has a driver's license with the ordinary qualifications for driving the host vehicle, if the matter of not having an ordinary driver's license is registered in the driving aptitude information of the occupant, it is determined that the "occupant does not have driving aptitude".

The other steps S33 to S36 correspond to steps S13 to S16, respectively, and therefore descriptions thereof are omitted.

The action is described next. Similar to the first embodiment, the action of the third embodiment exhibits "processing action for generating a target path and setting a target speed value of an autonomous vehicle" and "characteristic action for generating a target path for an autonomous vehicle". As shall be apparent, each of the steps S11 to S16 of the first embodiment is changed to be read as step S31 to step S36, respectively. The action of the third embodiment exhibits the characteristic action of the second embodiment. Moreover, in the case of the action of the third embodiment, the following characteristic action of the third embodiment is shown.

In the third embodiment, when the presence or absence of an occupant is to be determined, it is determined that an occupant is present when the occupant has driving aptitude, and it is determined that no occupant is present when the occupant does not have driving aptitude. That is, when an occupant does not have driving aptitude, it is determined that no occupant is present, and therefore even if an occupant is actually present in the host vehicle, a second target path is generated for a case in which no occupant has the skill that would enable backup through an onboard operation device. This second target path is a target path that prioritizes ensuring margins with respect to each environmental factor in the surroundings of the host vehicle. Accordingly, even if an occupant is actually present in the host vehicle, a margin allowance with respect to travel lane departure is maximally ensured when none of the occupants have driving aptitude.

Next, effects shall be described. The effects described in (1) to (5) for the first embodiment and (6) for the second embodiment are obtained with the method and device for generating a target path for an autonomous vehicle of the third embodiment. In addition, the following effect (7) can also be obtained with the method for generating a target path for an autonomous vehicle of the third embodiment.

(7) When the presence or absence of an occupant is to be determined, it is determined that an occupant is present when the occupant has driving aptitude, and it is determined that no occupant is present when the occupant does not have driving aptitude. Therefore, even if an occupant is actually present in the host vehicle, a margin allowance with respect to travel lane departure can be maximally ensured when no occupant has driving aptitude.

Fourth Embodiment

The fourth embodiment is a case in which the presence or absence of an occupant is determined by the seating position of an occupant, the driving aptitude of the occupant, and the occupant state.

First, the configuration shall be described. A method and device for generating a target path for an autonomous vehicle in the fourth embodiment are applied to an autonomous vehicle for which steering, driving, and braking can be externally controlled, the autonomous vehicle being based on a motor-driven hybrid vehicle (one example of an electric-powered vehicle). The description of the configuration of the fourth embodiment below is divided into an "autonomous driving system configuration", a "detailed configuration of a recognition determination processor for autonomous driving" and a "processing configuration for generating a target path and setting a target speed value for an autonomous vehicle".

Autonomous Driving System Configuration

Figure 13:
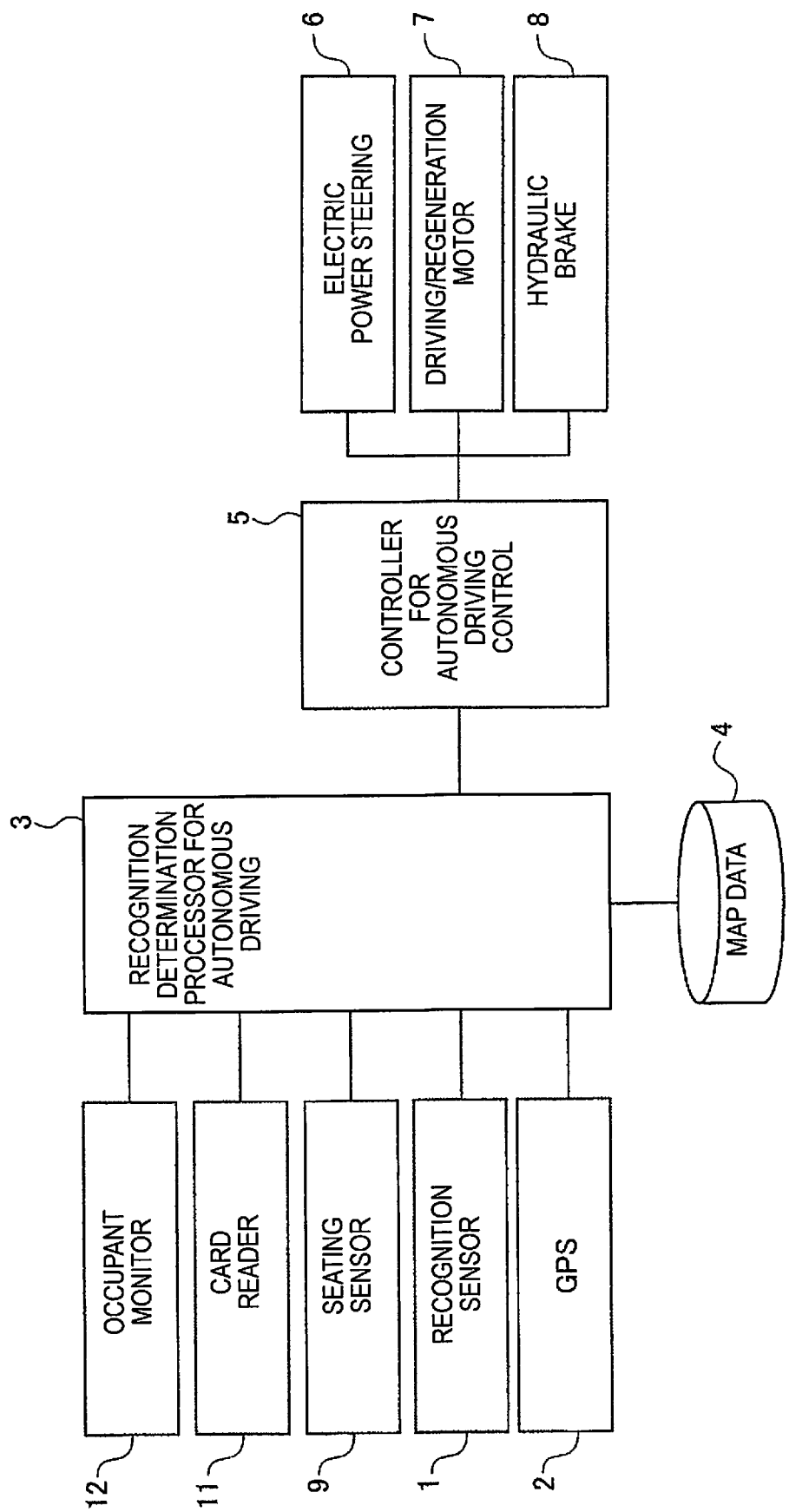
FIG. 13 is an overall configuration drawing illustrating an autonomous driving system configuration for an autonomous vehicle in which a method and a device are applied for generating a target path for an autonomous vehicle of the fourth embodiment.

FIG. 13 shows an autonomous driving system configuration of an autonomous vehicle in which the method and device for generating a target path for an autonomous vehicle of the fourth embodiment are applied. The overall configuration of the autonomous driving system is described below on the basis of FIG. 13.

The autonomous driving system is provided with a recognition sensor 1, a GPS 2, a recognition determination processor 3 (controller) for autonomous driving, and map data 4. The autonomous driving system is also provided with a controller 5 for autonomous driving control, electric power steering 6, a driving/regeneration motor 7, a hydraulic brake 8, a seating sensor 9, a card reader 11, and an occupant monitor 12. A brake pedal and steering wheel (handle) are provided as onboard operation devices at the driver's seat of the vehicle.

The seating sensor 9 is attached to a seat in the vehicle, and detects pressure when an occupant is seated. The seating sensor 9 also detects at which position the occupant is seated. For example, the seating sensor 9 detects whether the occupant is seated in the driver's seat, the front passenger's seat, or a rear passenger's seat. Through this, the presence or absence of an occupant is determined.

In order to read and acquire driving aptitude information of an occupant, the card reader 11 reads a card on which registered information is recorded. Examples of registered information include the presence or absence of a driver's license, the type of driver's license, and age. This card must be pre-registered before the occupant boards the vehicle.

The occupant monitor 12 detects, through a camera in the vehicle interior, the state of an occupant who has boarded at a position from which backup is possible through an onboard operation device. Here, the matter of a "position from which backup is possible through an onboard operation device" means the driver's seat position. This occupant monitor 12 detects the face of an occupant seated at the driver's seat position, and detects the state of the occupant by monitoring details such as an extent of opening or closing of eyes, a line of sight direction, and a riding posture.

The other configurations are the same as those of the first embodiment, and therefore corresponding configurations are assigned the same reference numerals, and descriptions thereof are omitted.

Detailed Configuration of Recognition Determination Processor for Autonomous Driving The occupant determination unit 51 (occupant determining means, occupant seating position determining means, occupant driving aptitude determining means, and occupant state determining means) receives a seating signal and an occupant seating position signal from the seating sensor 9. The occupant determination unit 51 also receives driving aptitude information of the occupant from the card reader 11, and receives the state of the occupant from the occupant monitor 12. The occupant determination unit 51 then determines the presence or absence of an occupant on the basis of the seating signal, the occupant seating position signal, the driving aptitude information for the occupant, and the occupant state information. The other configurations are the same as those of the first embodiment, and therefore illustrations and descriptions thereof are omitted.

Figure 14:
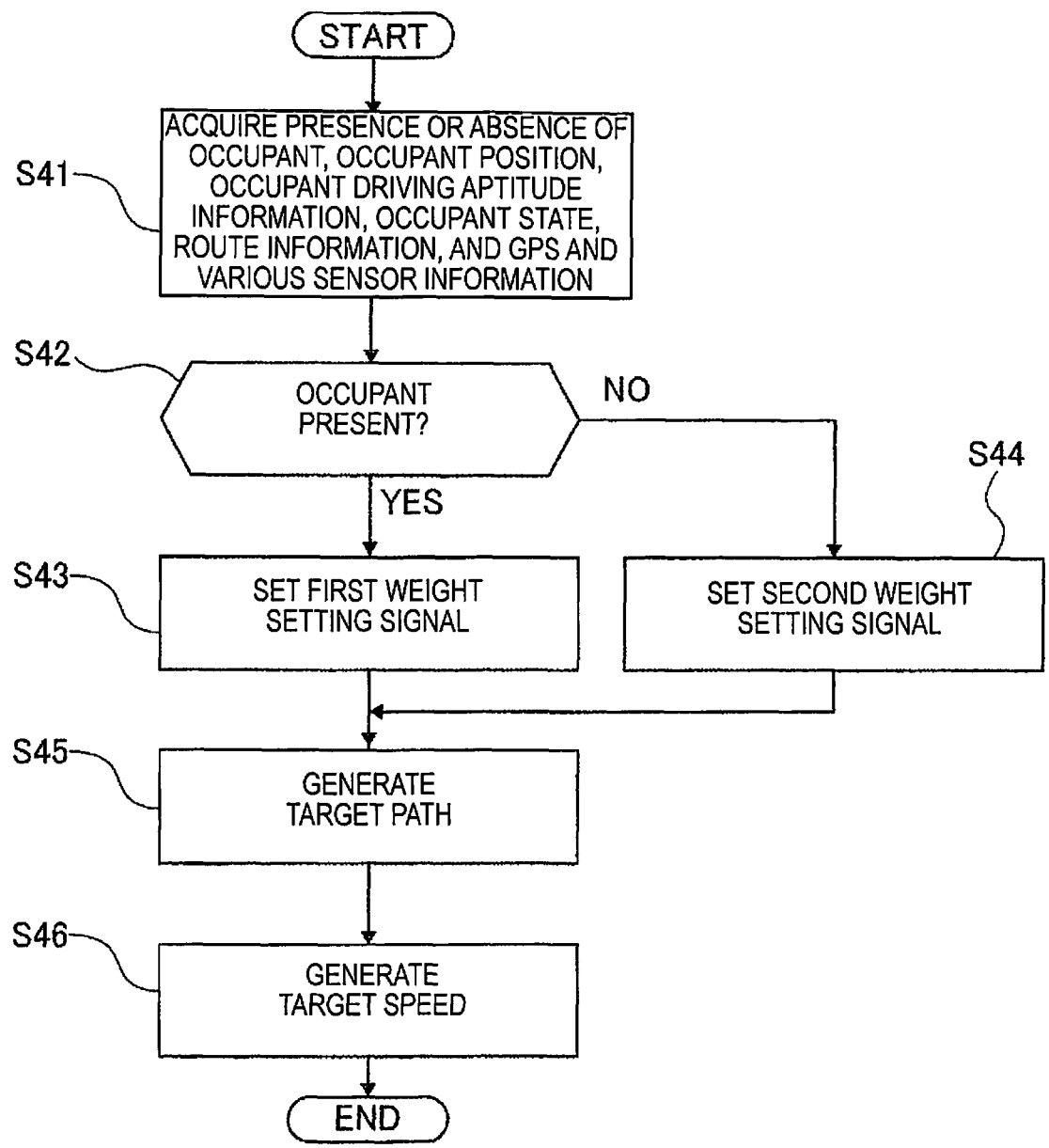
FIG. 14 is a flowchart illustrating the flow of target path generation process and target speed value setting process for an autonomous vehicle, executed by a recognition determination processor for autonomous driving of the fourth embodiment.

Processing Configuration for Generating a Target Path And Setting a Target Speed Value for an Autonomous Vehicle FIG. 14 shows the flow of target path generation process and target speed value setting process for an autonomous vehicle, executed by a recognition determination processor for autonomous driving of the fourth embodiment. In the flowchart of FIG. 14, the method for setting the route, and the matter of the GPS 2 and map data 4 being high precision elements are the same as in FIG. 3, and therefore descriptions thereof are omitted. Each step in the flowchart shown in FIG. 14, which shows the processing configuration for generating a target path and setting a target speed value of an autonomous vehicle, is described on the basis of FIG. 14.

In step S41, various types of information are acquired, and processing then advances to step S42. More specifically, information on the seating signal (presence or absence of an occupant) and occupant seating position signal (occupant position) is acquired by the seating sensor 9. Moreover, driving aptitude information of the occupant (occupant driving aptitude information) is acquired by the card reader 11. In addition, occupant state information (occupant state) is acquired by the occupant monitor 12. Other information and details, etc., are the same as in step S11, and therefore a description thereof is omitted.

In step S42, which follows the acquisition of various types of information in step S41, the presence or absence of an occupant is determined on the basis of the seating signal, seating position signal, occupant driving aptitude information, and occupant state information acquired in step S41. If YES (occupant is present), the processing advances to step S43, and if NO (no occupant is present), the processing advances to step S44. Step S42 corresponds to the occupant determination unit 51.

More specifically, in step S42, when the presence or absence of an occupant is to be determined, it is determined that an occupant is present when the seating position of the occupant is a position at which an onboard operation device can be operated, the occupant has driving aptitude, and the occupant is in a state of paying attention to the surroundings of the host vehicle. Moreover, in step S42, when the presence or absence of an occupant is to be determined, it is determined that no occupant is present when the seating position of the occupant is a position at which the onboard operation device cannot be operated, or the occupant does not have driving aptitude, or the occupant is in a state of not paying attention to the surroundings of the host vehicle. For a case in which no occupant is actually present in the host vehicle, it is determined that no occupant is present. The presence or absence of an occupant in this step S42 is not the actual presence or absence of an occupant, but rather the presence or absence of an occupant from a control perspective. Therefore, even if an occupant is actually present in the host vehicle, from a control perspective, the occupant can be determined as not being present in the host vehicle (no occupant is present).

Here, the matter of the "occupant is in a state of paying attention to the surroundings of the host vehicle" means a state in which the occupant is actually paying attention to the surroundings of the host vehicle so that the occupant can drive as the driver. On the other hand, the matter of the "occupant is in a state of not paying attention to the surroundings of the host vehicle" means a state in which the occupant is not actually paying attention to the surroundings of the host vehicle as necessary for driving as the driver. Examples of such a state include a state in which the eyes of the occupant are closed (extent of wakefulness), a state in which the line of sight of the occupant is oriented in a direction that is opposite the advancing direction of the host vehicle, or a state in which the occupant has reclined the seat and is lying down. In other words, the occupant determination unit 51 determines whether the occupant is in a state of paying attention to the surroundings of the host vehicle from monitored information such as the extent of opening or closing of the eyes, the line of sight direction, and the riding posture. Details regarding the "seating position of the occupant is a position at which an onboard operation device can be operated", the "seating position of the occupant is a position at which an onboard operation device cannot be operated", the "occupant has driving aptitude" and the "occupant does not have driving aptitude" are the same as with the third embodiment, and therefore descriptions thereof are omitted.

The other steps S43 to S46 correspond to steps S13 to S16, respectively, and therefore descriptions thereof are omitted.

The action shall be described next. Similar to the first embodiment, the action of the fourth embodiment exhibits "processing action for generating a target path and setting a target speed value of an autonomous vehicle" and "characteristic action for generating a target path for an autonomous vehicle". As shall be apparent, each of the steps S11 to S16 of the first embodiment is changed to be read as step S41 to step S46, respectively. Moreover, the action of the fourth embodiment exhibits the characteristic action of the second embodiment and the characteristic action of the third embodiment. In addition, the action of the fourth embodiment exhibits the following characteristic action of the fourth embodiment.

In the fourth embodiment, when the presence or absence of an occupant is to be determined, it is determined that an occupant is present when the occupant is in a state of paying attention to the surroundings of the host vehicle, and it is determined that no occupant is present when the occupant is in a state of not paying attention to the surroundings of the host vehicle. That is, when the occupant is in a state of not paying attention to the surroundings of the host vehicle as determined from details such as the extent of wakefulness and riding posture of the occupant, it is determined that no occupant is present, and therefore even if an occupant is actually present in the host vehicle, a second target path is generated for a case in which it would be difficult to immediately perform backup through an onboard operation device. This second target path is a target path that prioritizes ensuring margins with respect to each environmental factor in the surroundings of the host vehicle. Accordingly, even if an occupant is actually present in the host vehicle, a margin allowance with respect to travel lane departure is maximally ensured for a case in which a backup system cannot be immediately operated through an onboard operation device due to the occupant state.

Next, effects shall be described. The effects described in (1) to (5) for the first embodiment, (6) for the second embodiment, and (7) for the third embodiment are obtained with the method and device for generating a target path for an autonomous vehicle of the fourth embodiment. In addition, the following effect (8) can also be obtained with the method for generating a target path for an autonomous vehicle of the fourth embodiment.

(8) When the presence or absence of an occupant is to be determined, it is determined that an occupant is present when the occupant is in a state of paying attention to the surroundings of the host vehicle, and it is determined that no occupant is present when the occupant is in a state of not paying attention to the surroundings of the host vehicle. Therefore, even if an occupant is actually present in the host vehicle, a margin allowance with respect to travel lane departure can be maximally ensured when a backup system cannot be immediately operated through an onboard operation device due to the occupant state.

The method and device for generating a target path for an autonomous vehicle of the present disclosure were described above on the basis of the first to fourth embodiments. However, the specific configuration is not limited by these first to fourth embodiments; design changes and additions, etc., are allowed as long such changes, etc., do not depart from the gist of the invention as in each of the claims, In the first to fourth embodiments, examples of route setting were presented in which the route to the destination was automatically calculated on the basis of destination information input manually by an occupant or an operator outside of the vehicle. However, route setting is not limited thereto. For example, the route to the destination can also be automatically calculated on the basis of destination information automatically input in accordance with a predetermined sequence on a system side.

In first to fourth embodiments, examples of determining the presence or absence of an occupant and the seating position of the occupant on the basis of signals from a seating sensor 9 attached to a seat inside the vehicle were presented. However, the determination thereof is not limited thereto. For example, the means for determining the presence or absence of an occupant and the seating position of the occupant can be replaced by a means of confirming whether a seatbelt is used, a means of determining using an infrared sensor or an image sensor attached inside the vehicle, or a means of determining based on whether route setting and a departure command were performed from inside the vehicle or outside the vehicle. Moreover, these can be combined to determine the presence or absence of an occupant and the occupant seating position.

In the second embodiment, an example in which a stop vehicle button 10 was used as an onboard operation device was presented. However, the onboard operation device is not limited thereto; the onboard operation device can be a brake pedal and steering wheel (handle) provided at the driver's seat of the vehicle. In this case, for example, even if an occupant is actually present in the host vehicle, when the seating position of the occupant is front passenger's seat position or the rear passenger's seat position and not the driver's seat position, backup through the brake pedal and steering wheel is difficult, and therefore it is determined that no occupant is present.

In the second embodiment, an example was presented in which the stop vehicle button was positioned at a vehicle-width center section of the instrument panel. However, the position of the stop vehicle button is not limited thereto; the stop vehicle button can be provided at the back side of the seats of the driver's seat and front passenger's seat. In this case, if an occupant is actually present in the host vehicle, and the seating position of the occupant is the rear passenger's seat position, it is determined that an occupant is present. Moreover, even if an occupant is actually present in the host vehicle, when the seating position of the occupant in this case is the driver's seat position or the front passenger's seat position, it is determined that no occupant is present.

In third and fourth embodiments, examples were presented in which a brake pedal and a steering wheel were used as onboard operation devices. However, the onboard operation device is not limited thereto, and can be a stop vehicle button as in the second embodiment. However, this stop vehicle button shall be provided, for example, at a vehicle-width center section of the instrument panel. In this case, for example, even if an occupant is actually present in the host vehicle, when the seating position of the occupant is the rear passenger's seat position, backup through the stop vehicle button would be difficult even if the occupant has driving aptitude and the occupant is in a state of paying attention to the surroundings of the host vehicle, and therefore it is determined that no occupant is present.

In the second to fourth embodiments, examples were presented in which it was determined from a control perspective that no occupant was present in the host vehicle even when an occupant was actually present in the host vehicle. However, even if no occupant is actually present in the host vehicle, it can be determined from a control perspective that an occupant is present in the host vehicle (occupant is present). For example, the presence or absence of an occupant can be determined in accordance with an "example of determining the presence or absence of an occupant through a trailing vehicle", an "example of determining the presence or absence of an occupant through a travel schedule", or an "example of determining the presence or absence of an occupant through a travelable distance", presented below.

Example of Determining the Presence or Absence of an Occupant Through a Trailing Vehicle The recognition sensor 1 of an autonomous driving system detects information on the relative speed and relative distance between a host vehicle and a traveling vehicle.

Next, the target path generation process configuration of the autonomous vehicle shall be described. First, the recognition determination processor for autonomous driving acquires the information on the relative speed and relative distance between the host vehicle and trailing vehicle from the recognition sensor. Next, on the basis of these pieces of information, the presence or absence of an occupant is determined by the occupant determination unit (occupant determining means and trailing vehicle determining means). More specifically, when the presence or absence of an occupant is to be determined, it is temporarily determined that an occupant is present when a trailing vehicle following behind the host vehicle is present. Also, when the presence or absence of an occupant is to be determined, is it determined that no occupant is present when there is no trailing vehicle following behind the host vehicle. Even in a case in which there is actually no occupant present in the host vehicle, the presence or absence of an occupant is determine from a control perspective on the basis of the presence or absence of a trailing vehicle. Moreover, the processing configuration after the determination of the presence or absence of an occupant is the same as that of steps S13 to S16 of the first embodiment.

Here, the matter of "a trailing vehicle following behind the host vehicle is present" means that a trailing vehicle that is approaching the host vehicle is present. This is determined by the occupant determination unit 51 from the information on the relative speed and the relative distance between the host vehicle and trailing vehicle.

Thus, when a trailing vehicle is present, it is temporarily determined that an occupant is present, and therefore even if an occupant is not actually present in the host vehicle, a first target path that allows travel by ordinary driving by a driver is generated. Through this, the target speed value is set higher than for a case in which it is determined that no occupant is present. Accordingly, even if an occupant is not actually present in the host vehicle, hindering of traffic flow can be suppressed. The target speed value is set higher for the first target path generated when an occupant is present than for the second target path generated when no occupant is present.

Moreover, the presence of absence of an occupant can also be determined on the basis of the presence or absence of a trailing vehicle, limited to cases in which the road width is wide, and there is allowance in the margin between the host vehicle and the travel path boundary. A first target path can be more safely generated by determining the presence or absence of an occupant in this manner. The presence or absence of an occupant can also be determined by the condition of trailing vehicles extending in a series, and not merely limited to the presence or absence of a trailing vehicle.

Example of Determining the Presence or Absence of an Occupant Through a Travel Schedule The host vehicle is a system like that of a Robot Taxi (registered trademark). Therefore, the host vehicle is such that the next destination and arrival time are remotely managed at a control system side (travel schedule management means). That is, the travel schedule of the host vehicle is managed at the control system side. The travel schedule for the host vehicle includes current position information of the host vehicle and current time information, as well as other information such as the next scheduled time information and scheduled location information for the travel schedule. From these types of information, the control system side determines whether the next scheduled time of the travel schedule is approaching.

Here, the matter of the "next scheduled time of the travel schedule is approaching" means that the inability to arrive at a scheduled location (next location where a passenger is present) by the next scheduled time (arrival time) of the travel schedule is anticipated from the current position information and the current time information. An example is a case in which a service plan is overscheduled.

Next, a target path generation process configuration for an autonomous vehicle is described. First, the recognition determination processor for autonomous driving acquires information on "whether the next scheduled time of the travel schedule is approaching" from the control system. Subsequently, the occupant determination unit (occupant determining means, travel schedule management means) determines the presence or absence of an occupant on the basis of this information. More specifically, when the presence or absence of an occupant is to be determined, when the next scheduled time of the travel schedule is approaching, it is temporarily determined that an occupant is present. Moreover, when the presence or absence of an occupant is to be determined, it is determined that no occupant is present when the next scheduled time of the travel schedule is not approaching. Even if an occupant is not actually present in the host vehicle, the presence or absence of an occupant is determined from a control perspective on the basis of whether the next scheduled time of the travel schedule is approaching. The processing configuration after determination of the presence or absence of an occupant is the same as steps S13 to S16 of the first embodiment. Here, "temporarily" means during the time that it is assumed that the host vehicle cannot arrive at the scheduled location by the next scheduled time of the travel schedule. The autonomous driving system has a means for communicating (a wireless communication unit for example) between the host vehicle and the control system.

Therefore, when the next scheduled time of the travel schedule is approaching, it is temporarily determined than an occupant is present, and thus even if an occupant is not actually present in the host vehicle, a first target path like that which would allow travel through ordinary driving by a driver is generated. Through this, the target speed value is set higher than a case in which it is determined that no occupant is present. Accordingly, even if an occupant is not actually present in the host vehicle, unnecessary deceleration is suppressed, whereby the time of arrival at the next scheduled location in the travel schedule can be accelerated. The target speed value is set higher for the first target path generated when an occupant is present than for the second target path generated when no occupant is present.

Moreover, the presence of absence of an occupant can also be determined on the basis of whether the next scheduled time of the travel schedule is approaching, limited to a case in which the road width is wide, and there is allowance in the margin between the host vehicle and the travel path boundary. Because the presence or absence of an occupant is determined in this manner, a first target path can be more safely generated. The matter of whether the next scheduled time of the travel schedule is approaching can be determined by, inter alia, the occupant determination unit of the host vehicle.

Example of Determining the Presence or Absence of an Occupant Through a Travelable Distance The autonomous driving system has a fuel tank sensor that detects the remaining amount of fuel stored in a fuel tank, an SOC sensor that detects the charged state of a battery, and an energy monitor that monitors the remaining amount of fuel and energy state of the charged state of the battery.

Next, a target path generation process configuration of an autonomous vehicle is described. First, the recognition determination processor for autonomous driving acquires energy state information. Subsequently, the occupant determination unit (occupant determining means, travelable distance management means) determines the presence or absence of an occupant on the basis of this information. More specifically, when the presence or absence of an occupant is to be determined, it is temporarily determined that an occupant is present when the travelable distance falls below a predetermined distance (when the travelable distance becomes less than the predetermined distance). Also, when the presence or absence of an occupant is to be determined, it is determined that no occupant is present when the travelable distance exceeds the predetermined distance. Even if no occupant is actually present in the host vehicle, the presence of absence of an occupant is determined from a control perspective by whether the travelable distance falls below the predetermined distance. The processing configuration after determination of the presence or absence of an occupant is the same as steps S13 to S16 of the first embodiment.

Here, the "travelable distance" is the distance that can be traveled by the host vehicle. This travelable distance is calculated by the occupant determination unit on the basis of the energy state information. The occupant determination unit also records and manages the calculated travelable distance. The "predetermined distance" is the distance from the current position to an energy stand (refueling station or charging station).

Therefore, because it is temporarily determined that an occupant is present when the travelable distance falls below the predetermined distance, even if an occupant is not actually present in the host vehicle, a first target path that allows travel by ordinary driving by a driver is generated. Accordingly, even if an occupant is not actually present in the host vehicle, an unnecessary expansion of the width of acceleration and deceleration is suppressed (the width of fluctuation of vehicle speed when traveling on a curved road is suppressed), and thereby energy consumption can be suppressed.

In the first to fourth embodiments, examples were presented in which a steering actuator was used as the electric power steering 6, a drive source actuator was used as the driving/regeneration motor 7, and a brake actuator was used as the hydraulic brake 8, but the present disclosure is not limited thereto. Namely, each control system can be replaced with systems besides the abovementioned means (each type of actuator) as long as control of steering, driving, and braking with respect to the tires can be performed on the basis of external commands.

In the first to fourth embodiments, examples were presented in which a method and device for generating a target path for an autonomous vehicle of the present disclosure were applied to an autonomous vehicle for which steering, driving, and braking can be externally controlled, the autonomous vehicle being based on a motor-driven hybrid vehicle (one example of an electric-powered vehicle). However, the method and device for generating a target path for an autonomous vehicle of the present disclosure can also be applied to an electric vehicle and an engine vehicle. The present disclosure can also be applied to a vehicle for which at least steering, driving, and braking can be externally controlled.

The invention claimed is:

1. A target path generation method for generating a target path, in which a controller for generating a target path that can be tracked by a host vehicle, that does not deviate from a road, and that involves no contact with an obstacle is provided, the target path generation method for generating the target path for the autonomous vehicle comprising:
acquiring travel path boundaries of a road in a host vehicle surroundings using data from a first vehicle sensor;
determining a presence or absence of an occupant based on information from a second vehicle sensor;
if it is determined that the occupant is present, generating a first target path with regards to the travel path boundaries; and
if it is determined that the occupant is absent, generating a second target path with regards to the travel path boundaries, wherein:
the first target path is different than the second target path when traveling on a curved road, the first target path and the second target path are each determined based on a path curvature function and a margin function, the first target path is determined by placing a greater weight on the path curvature function than the margin function, and the second target path is determined by placing a greater weight on the margin function than the path curvature function.

2. The target path generation method according to claim 1, wherein
for the second target path, a distance between the host vehicle and right and left boundaries defining a travel lane is longer than that of the first target path.

3. The target path generation method according to claim 1, wherein
for the first target path, a path curvature calculated from individual points constituting the first target path is smaller than that of the second target path.

4. The target path generation method according to claim 1, further comprising
setting a value of a target speed the target speed based on whether the first target path or the second target path is generated, wherein the target speed is set to a speed not exceeding at least one of a lateral acceleration limit and a yaw rate limit for the host vehicle.

5. The target path generation method according to claim 1, wherein
in the determining of the presence or absence of the occupant, the occupant is determined to be present when a seating position of the occupant is a position at which an onboard operation device can be operated, and the occupant is determined to be absent when the seating position of the occupant is a position at which the onboard operation device cannot be operated.

6. The target path generation method according to claim 1, wherein
in the determining of the presence or absence of the occupant, the occupant is determined to be present when the occupant has driving aptitude, and the occupant is determined to be absent when no occupant has the driving aptitude.

7. The target path generation method according to claim 1, wherein
in the determining of the presence or absence of the occupant, the occupant is determined to be present when the occupant state is a state of paying attention to surroundings of the host vehicle, and the occupant is determined to be absent when the occupant state is a state of not paying attention to the surroundings of the host vehicle.

8. A target path generation device comprising:
a controller that generates a target path that can be tracked by a host vehicle, that does not deviate from a road, and that avoids contact with an obstacle;
a first vehicle sensor for recognizing travel path boundaries of a road in a host vehicle surroundings; and
a second vehicle sensor for determining a presence or absence of an occupant,
wherein the controller is configured to:
determine the presence or absence of the occupant based on information from the second vehicle sensor;
acquire the travel path boundaries using data from the first vehicle sensor;
if it is determined that the occupant is present, generate a first target path with regards to the travel path boundaries; and
if it is determined that the occupant is absent, generate a second target path with regards to the travel path boundaries and wherein:
the first target path is different than the second target path when traveling on a curved road,
the first target path and the second target path are each determined based on a path curvature function and a margin function,
the first target path is determined by placing a greater weight on the path curvature function than the margin function, and
the second target path is determined by placing a greater weight on the margin function than the path curvature function.

* * * * *